United States Patent
Bukola et al.

(10) Patent No.: US 12,489,131 B2
(45) Date of Patent: Dec. 2, 2025

(54) COMPOSITIONS FOR ENERGY CONVERSION AND STORAGE AND METHODS OF MAKING THE SAME

(71) Applicant: Alliance for Sustainable Energy, LLC, Golden, CO (US)

(72) Inventors: Saheed Abidemi Bukola, Longmont, CO (US); Bryan Scott Pivovar, Arvada, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 314 days.

(21) Appl. No.: 18/065,896

(22) Filed: Dec. 14, 2022

(65) Prior Publication Data

US 2023/0187674 A1 Jun. 15, 2023

Related U.S. Application Data

(60) Provisional application No. 63/289,534, filed on Dec. 14, 2021.

(51) Int. Cl.
*H01M 8/1053* (2016.01)
*C08G 73/18* (2006.01)
(Continued)

(52) U.S. Cl.
CPC .......... *H01M 8/1053* (2013.01); *C08G 73/18* (2013.01); *C08J 5/2281* (2013.01); *C08J 5/2287* (2013.01);
(Continued)

(58) Field of Classification Search
CPC .. H01M 8/1053; H01M 8/103; H01M 8/1039; H01M 8/106; H01M 8/1067;
(Continued)

(56) References Cited

U.S. PATENT DOCUMENTS

| 4,634,530 A | 1/1987 | Kuder et al. |
| 2013/0115543 A1* | 5/2013 | Kudo ............... H01M 8/103 |
| | | 429/493 |

(Continued)

FOREIGN PATENT DOCUMENTS

WO 2017184229 A2 10/2017

OTHER PUBLICATIONS

Ayad, A. et al., "Comparative study of protonic conducting polymers incorporated in the oxygen electrode of the PEMFC," Journal of Power Sources, vol. 149, 2005, 6 pages.
(Continued)

*Primary Examiner* — James Lee
(74) *Attorney, Agent, or Firm* — Michael A. McIntyre

(57) ABSTRACT

The present disclosure relates to a composition that includes a first layer that includes a polymer having a repeat unit with a structure that includes

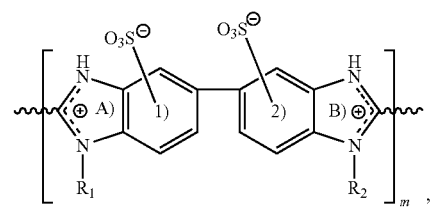

where m is between 2 and 100, inclusively, the repeat unit is protonated at at least one of position A) and/or B) and/or sulfonated at at least one of rings 1) and/or 2), $R_1$ includes at least one of a lone pair of electrons, a covalent bond, hydrogen, and/or a hydrocarbon functional group, $R_2$ (Continued)

includes at least one of a lone pair of electrons, a covalent bond, hydrogen, and/or a hydrocarbon functional group, and

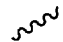 is a covalent bond.

12 Claims, 32 Drawing Sheets

(51) Int. Cl.
| | |
|---|---|
| C08J 5/22 | (2006.01) |
| H01M 8/103 | (2016.01) |
| H01M 8/1039 | (2016.01) |
| H01M 8/106 | (2016.01) |
| H01M 8/1067 | (2016.01) |
| H01M 8/1088 | (2016.01) |
| H01M 8/18 | (2006.01) |

(52) U.S. Cl.
CPC ......... *H01M 8/103* (2013.01); *H01M 8/1039* (2013.01); *H01M 8/106* (2013.01); *H01M 8/1067* (2013.01); *H01M 8/1088* (2013.01); *H01M 8/188* (2013.01); *C08J 2351/08* (2013.01); *C08J 2379/04* (2013.01)

(58) Field of Classification Search
CPC .... H01M 8/1088; H01M 8/188; C08G 73/18; C08J 5/2281; C08J 5/2287
See application file for complete search history.

(56) References Cited

U.S. PATENT DOCUMENTS

| | | | | |
|---|---|---|---|---|
| 2017/0271704 | A1 | 9/2017 | Morris-Cohen | |
| 2020/0168937 | A1 | 5/2020 | Ahn et al. | |
| 2023/0072302 | A1* | 3/2023 | Ramkumar | H01M 8/1081 |
| 2023/0120463 | A1* | 4/2023 | Matsui | H01M 8/188 |
| | | | | 429/101 |

OTHER PUBLICATIONS

Bai, H. et al., "New sulfonated polybenzimidazole (SPBI) copolymer-based proton-exchange membranes for fuel cells," Journal of the Taiwan Institute of Chemical Engineers, vol. 40, 2009, 8 pages.
Bukola, S. et al., "Single layer graphene as a highly selective barrier for vanadium crossover with high proton selectivity," Journal of Energy Chemistry, vol. 59, 2021, 12 pages.
Chen, D. et al., "Advanced acid-base blend ion exchange membranes with high performance for vanadium flow battery application," Journal of Membrane Science, vol. 553, 2018, 7 pages.
Cichon, P.J. et al., "Sulfonated poly(arylene thioether phosphine oxide)s and poly(arylene ether phosphine oxide)s PBI-blend membranes and their performance in SO2 electrolysis," International Journal of Hydrogen Energy, vol. 41, 2016, 7 pages.
Deluga, G.A. et al., "Composite Membranes to Reduce Crossover in PEM Fuel Cells," IEEE, 2000, 3 pages.
Garrick, T.R. et al., "Characterizing Voltage Losses in an SO2 Depolarized Electrolyzer Using Sulfonated Polybenzimidazole Membranes," Journal of The Electrochemical Society, vol. 164, No. 14, 2017, 6 pages.
Geng, K. et al., "A novel polybenzimidazole membrane containing bulky naphthalene group for vanadium flow battery," Journal of Membrane Society, vol. 586, 2019, 9 pages.
Glipa, X. et al., "Investigation of the conduction properties of phosphoric and sulfuric acid doped polybenzimidazole," Journal of Materials Chemistry, 1999, vol. 9, 5 pages.
Hwang, K. et al., "Preparation of Polybenzimidazole-Based Membranes and Their Potential Applications in the Fuel Cell System," Energies, vol. 7, 2014, 12 pages.

Huang, B. et al., "Mechanically strong sulfonated polybenzimidazole PEMs with enhanced proton conductivity," Materials Letters, vol. 234, 2019, 3 pages.
Kumar B., S. et al., "Polybenzimidazole co-polyers: their synthesis, morphology and high temperature fuel cell membrane properties," RSC Polymer Chemistry, vol. 11, 2020, 12 pages.
Li, J. et al., "Preparation and characterization of sulfonated polyimide/TiO2 composite membrane for vanadium redox flow battery," J. Solid State Electrochem, vol. 18, 2014, 9 pages.
Lin, H-L et al., Polybenzimidazole and butylsulfonate grafted polybenzimidazole blends for proton exchange membrane fuel cells, Journal of Membrane Science, vol. 389, 2012, 8 pages.
Luo, Q. et al., "Modification of Nafion membrane using interfacial polymerization for vanadium redox flow battery applications," Journal of Membrane Science, vol. 311, 2008, 6 pages.
Luo, T. et al., "Porous poly(benzimidazole) membrane for all vanadium redox flow battery," Journal of Power Sources, vol. 312, 2016, 10 pages.
Mai, Z. et al., "Nafion/polyvinylidene fluoride blend membranes with improved ion selectivity for vanadium redox flow battery application," Journal of Power Sources, vol. 196, 2011, 5 pages.
Mader and Benicewicz, "Sulfonated Polybenzimidazoles for High Temperature PEM Fuel Cells," Macromolecules, vol. 43, 2010, 10 pages.
Maity, S. et al.,"Polybenzimidazole Block Copolymers for Fuel Cell: Synthesis and Studies of Block Length Effects on Nanophase Separation, Mechanical Properties, and Proton Conductivity of PEM," Applied Materials & Interfaces, vol. 6, 2014, 14 pages.
Mondal, S. et al., "Reduction of methanol crossover and improved electrical efficiency in direct methanol fuel cell by the formation of a thin layer on Nafion 117 membrane: Effect of dip-coating of a blend of sulphonated PVdF-co-HFP and PBI," Journal of Membrane Science, vol. 474, 2015, 8 pages.
Noh, C. et al., "Optimizing the performance of meta-polybenzimidazole membranes in vanadium redox flow batteries by adding an alkaline pre-swelling step," Chemical Engineering Journal, vol. 407, 2021, 9 pages.
Oldenburg, F.J. et al., "Tackling Capacity Fading in Vanadium Redox Flow Batteries with Amphoteric Polybenzimidazole/Nafion Bilayer Membranes," Wiley ChemPubSoc Europe, vol. 12, 2019, 8 pages.
Odom, S., "Preventing Crossover in Redox Flow Batteries through Active Material Oligomerization," ACS Central Science, vol. 4, 2018, 2 pages.
Peng, S. et al.., "A H3PO4 preswelling strategy to enhance the proton conductivity of a H2SO4-doped bolybenzimidazole membrane for vanadium flow batteries," RSC Advances, vol. 6, 2016, 10 pages.
Pu, H. et al., "Proton Transport in Polybenzimidazole Blended with H3PO4 or H2SO4," Journal of Polymer Science: Part B: Polymer Physics, vol. 40, 2002, 7 pages.
Sizov, V.E. et al., "Ion transport properties of porous polybenzimidazole membranes for vanadium redox flow batteries obtained via supercritical drying of swollen polymer films," Journal of Applied Polymer Science, 2018, 9 pages.
Struzynska-Piron, I. et al., "Imidazole based ionenes, their blends with PBI-OO and applicability as membrane in a vanadium Redox flow battery," European Polymer Journal, vol. 96, 2017, 10 pages.
Sun, X. et al., "Composite Membranes for High Temperature PEM Fuel Cells and Electrolysers: A Critical Review," Membranes, vol. 9, No. 83, 2019, 46 pages.
Tan, Q. et al., "Doping structure and degradation mechanism of polypyrrole-Nation® composite membrane for vanadium redox flow batteries," RSC Advances Communication, vol. 6, 2016, 5 pages.
Taublaender, M.J. et al., "Hydrothermal Generation of Conjugated Polymers Using the Example of Pyrrone Polymers and Polybenzimidazoles," Angewandte Chemie Polymer Chemistry, vol. 59, 2020, 11 pages.

(56) References Cited

OTHER PUBLICATIONS

Wang, L. et al., "Sulfonated PBI Gel Membranes for Redox Flow Batteries," Journal of The Electrochemical Society, vol. 166, No. 8, 2019,. 7 pages.

Wu, C. et al., "A novel polysulfone-polyvinylpyrrolidone membrane with superior proton-to-vanadium ion selectivity for vanadium redox flow batteries," Journal of Materials Chemistry A, vol. 4, 2016, 6 pages.

Xia, Z. et al., "Preparation of covalently cross-linked sulfonated polybenzimidazole membranes for vanadium redox flow battery applications," Journal of Membrane Science, vol. 525, 2017, 11 pages.

Yan, W. et al., "All-polymer particulate slurry batteries," Nature Communications, vol. 10, 2019, 11 pages.

Yuan, Q. et al., "Copolymerization of 4-(3,4-diamino-phenoxy)-benzoic acid and 3,4-diaminobenzoic acid towards H3PO4-doped PBI membranes for proton conductor with better processability," European Polymer Journal, vol. 85, 2016, 12 pages.

Yuan, Z. et al., "Application and degradation mechanism of polyoxadiazole based membrane for vanadium flow batteries," Journal of Membrane Science, vol. 488, 2015, 9 pages.

Zeng, J. et al., "Studies on polypyrrole modified nafion membrane for vanadium redox flow battery," Electrochemistry Communications, vol. 10, 2008, 4 pages.

Zhang, H. et al., "Nanofiltration (NF) membranes: the next generation separators for all vanadium redox flow batteries (VRBs)?," Energy & Environmental Science, vol. 4, 2011, 4 pages.

Zhao, B. et al., "Grafted polybenzimidazole copolymers bearing polyhedral oligosilsesquioxane pendant moieties," European Polymer Journal, vol. 94, 2017, 12 pages.

Zhou, X.L. et al., "The use of polybenzimidazole membranes in vanadium redox flow batteries leading to increased coulombic efficiency and cycling performance," Electrochimica Acta, vol. 153, 2015, 7 pages.

Peng, S. et al., "Thin skinned asymmetric polybenzimidazole membranes with readily tunable morphologies for high-performance vanadium flow batteries," RSC Advances, vol. 7, 2017, 11 pages.

\* cited by examiner

COMPOSITIONS FOR ENERGY CONVERSION AND STORAGE AND METHODS OF MAKING THE SAME

CROSS-REFERENCE TO RELATED APPLICATIONS

This application claims priority from U.S. Provisional Patent Application No. 63/289,534 filed on Dec. 14, 2021, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

The broad deployment of redox flow batteries is hindered, in part, due to the lack of highly selective ion-exchange membranes with high proton conductivity. Thus, there remains a need for improved materials that solve these deficiencies.

SUMMARY

An aspect of the present disclosure is a composition that includes a first layer that includes a polymer having a repeat unit having a structure that includes

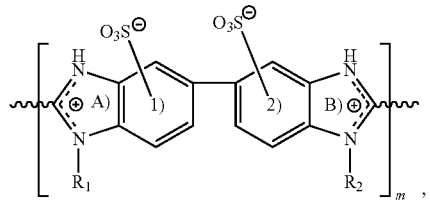

m, where m is between 2 and 100, inclusively, the repeat unit is protonated at at least one of position A) and/or B) and/or sulfonated at at least one of rings 1) and/or 2), $R_1$ includes at least one of a lone pair of electrons, a covalent bond, hydrogen, and/or a hydrocarbon functional group, $R_2$ includes at least one of a lone pair of electrons, a covalent bond, hydrogen, and/or a hydrocarbon functional group, and ⌇ is a covalent bond.

In some embodiments of the present disclosure, the repeat unit may further include a benzene ring such that the structure includes

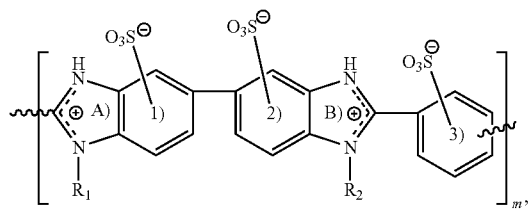

the repeat unit is protonated at at least one of position A) and/or B) and/or sulfonated at at least one of rings 1), 2), and/or 3).

In some embodiments of the present disclosure, the repeat unit may be protonated at at least one of position A) and/or B) and sulfonated at at least one of rings 1), 2), and/or 3). In some embodiments of the present disclosure, repeat unit may have a molecular weight between 100 g/mol and 350 g/mol, inclusively. In some embodiments of the present disclosure, the first layer may have an average thickness between 1 μm and 1000 μm, inclusively. In some embodiments of the present disclosure, the first layer may have a vanadium permeability less than about $2.0 \times 10^{-11}$ cm$^2$/min. In some embodiments of the present disclosure, the first layer may have a proton conductivity between about 100 mS/cm and about 300 mS/cm when measured immersed in an acidic electrolyte. In some embodiments of the present disclosure, the first layer may have a tensile strength greater than about 100 MPa. In some embodiments of the present disclosure, the first layer may have a Young's modulus greater than about 3000 Mpa.

In some embodiments of the present disclosure, the repeat unit may further include an anion. In some embodiments of the present disclosure, the anion may include at least one of $H_2PO_4$, $SO_4^{2-}$, and/or $HSO_4^-$. In some embodiments of the present disclosure, the composition may further include a second layer that includes a perfluorosulfonic acid ionomer, where the first layer is positioned adjacent to the second layer, forming a composite layer. In some embodiments of the present disclosure, the composition may further include a support layer, where the support layer is positioned adjacent to at least one of the first layer or the second layer. In some embodiments of the present disclosure, the support layer may include at least one of a fiberglass and/or polyethylene terephthalate.

An aspect of the present disclosure is a method that includes immersing in a solution a polymer having a repeat unit with a structure that includes at least one of

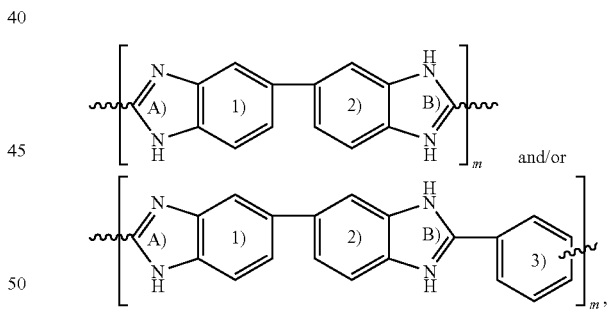

where the solution includes sulfuric acid and phosphoric acid, the immersing results in the transforming of the structure to at least one of a protonated structure and/or a sulfonated structure, m is between 2 and 100, inclusively, the repeat unit is protonated at at least one of position A) and/or B) and/or sulfonated at at least one of rings 1), 2) and/or 3), $R_1$ includes at least one of a lone pair of electrons, a covalent bond, hydrogen, and/or a hydrocarbon functional group, $R_2$ includes at least one of a lone pair of electrons, a covalent bond, hydrogen, and/or a hydrocarbon functional group, ⌇ and is a covalent bond.

In some embodiments of the present disclosure, the immersing may be performed at a temperature between about 120° C. and about 200° C. In some embodiments of the present disclosure, the immersing may be performed for a period of time between about 3 hour and about 24 hours. In some embodiments of the present disclosure, prior to the immersing, the phosphoric acid may be provided to the solution at a concentration between about 50 wt % and about 100 wt. % $H_3PO_4$. In some embodiments of the present disclosure, prior to the immersing, the sulfuric acid may be provided to the solution at a concentration between about 50 wt % and about 100 wt. % $H_2SO_4$.

An aspect of the present disclosure is a flow battery that includes a layer having a composition as described herein, where the flow battery is characterized by a coulombic efficiency of greater than about 99.5%.

BRIEF DESCRIPTION OF DRAWINGS

Some embodiments are illustrated in referenced figures of the drawings. It is intended that the embodiments and figures disclosed herein are to be considered illustrative rather than limiting.

DETAILED DESCRIPTION

Figure 1A:
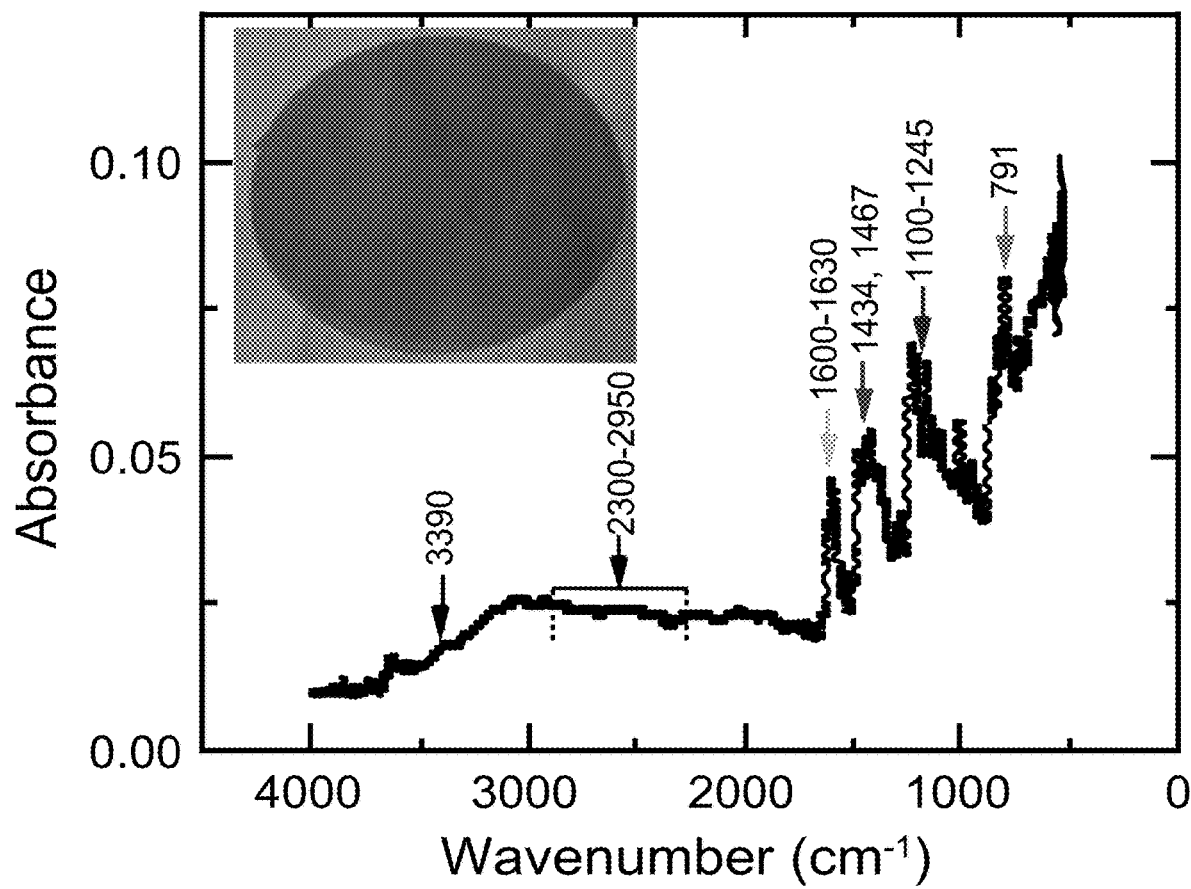
FIG. 1A illustrates an FTIR spectrum of unfunctionalized PBI polymer, according to some embodiments of the present disclosure. The inset is a photograph of PBI polymer before functionalization.

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure relates to membranes, films, layers, collectively referred to herein as "layers", designed for energy conversion and storage device. These layers are characterized by, among other things, the ability to provide the selective diffusion of charge-balancing ions, while simultaneously decreasing or eliminating the cross-permeation of undesirable ionic species. Novel methods for making these materials are also described herein. In short, in some embodiments of the present disclosure, polybenzimidazole polymers (PBI polymers) may be functionalized with acid groups by exposing a starting PBI polymer to a mixture of phosphoric and sulfuric acids ($H_3PO_4/H_2SO_4$). In some embodiments of the present disclosure, the resultant acid functionalized and protonated PBI polymer may be provided in the form of a layer and/or combined with a perfluorosulfonic acid ionomer (PFSA) (e.g., Nafion®) layer to form a functionalized PBI polymer/PFSA ionomer multi-layer composite characterized by exceptional performance metrics such as low cross-over and high proton conductivity. As shown herein, using a four-point probe direct current pulse technique, an exemplary PBI polymer/Nafion© ionomer composite resulted in a high proton conductivity of about 0.096±0.001 S cm$^{-1}$, at room temperature. This exemplary PBI polymer/Nafion® ionomer composite further demonstrated impressive electromigration mitigation and durability under applied current up to 500 mA cm$^{-2}$ and voltage pulses up to 1.4 V, and the ability to completely inhibit ionic species diffusion crossover of vanadium and iron. The absence of spectroscopically detectable ionic species cross-permeation indicates ion selectivity approaching infinity for this exemplary PBI polymer/Nafion© ionomer composite membrane. This property, in combination with the high proton transmission, suggests crossover may be eliminated, or at least greatly reduced, by incorporating functionalized PBI polymer layers and/or PBI polymer/PFSA ionomer composite layers into a variety of devices, for example, redox flow batteries, electrodialysis devices, fuel cells, and electrolyzers.

PBI polymers may be converted to sulfonated and protonated PBI polymers according to Reaction 1 and/or Reaction 2 shown below:

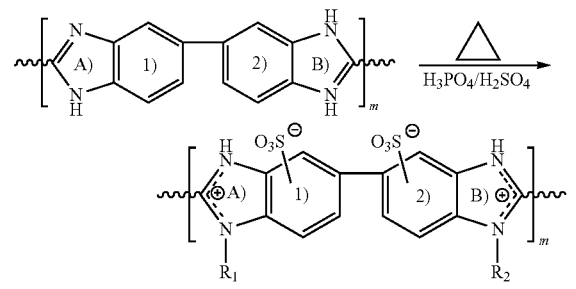

Reaction 1

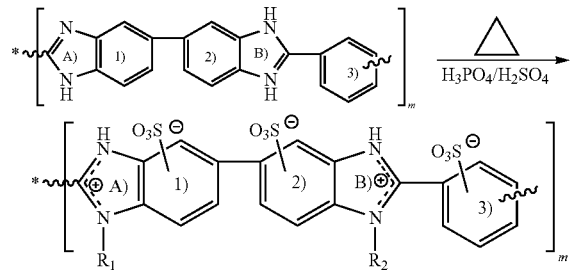

Reaction 2

The term "polymer", as used herein, includes polymers constructed of substantially only one repeat unit, as well as polymers constructed of more than one repeat unit (i.e., copolymers). Although many of the examples included herein are directed to polymers, resins also fall within the scope of the present disclosure. In some embodiments of the present disclosure, $R_1$ and/or $R_2$ may correspond to at least one of a lone pair of electrons, a covalent bond, hydrogen, and/or a hydrocarbon functional group (e.g., methyl, ethyl, propyl groups, etc.), ⌇⌇⌇ and represents a covalent bond. Reactions 1 and 2 illustrate the conversion of two exemplary PBI polymers, constructed of slightly different repeat units. Reaction 1 illustrates a starting polymer having a first repeat unit constructed of two benzimidazole units linked in series. Reaction 2 illustrates a starting polymer having a first repeat unit constructed of two benzimidazole units and a benzene ring linked in series. In each of the two reactions illustrated, the acid treatment in the presence of heat may result in the formation of a positively charged benzimidazole unit, e.g., at locations A) and/or B), and a negatively charged sulfonic functional group, e.g., at locations 1), 2), or 3). In some embodiments of the present disclosure, Reaction 1 may result in the formation of a functionalize PBI polymer that includes between zero and two positively charged benzimidazole units, inclusively, (e.g., at locations A) and/or B)) and between zero and two negatively charged sulfonic functional groups, inclusively (e.g., at locations 1) and/or 2)). In some embodiments of the present disclosure, Reaction 2 may result in the formation of a functionalize PBI polymer that includes between zero and two positively charged benzimidazole units, inclusively, (e.g., at locations A) and/or B)) and between zero and three negatively charged sulfonic functional groups, inclusively (e.g., at locations 1), 2), or 3)). In some embodiments of the present disclosure, Reaction 1 may result in the formation of a functionalize PBI polymer that includes zero, one, or two positively charged benzimidazole units. In some embodiments of the present disclosure, Reaction 1 may result in the formation of a functionalize PBI polymer that includes, zero, one, or two negatively charged sulfonic functional groups. In some embodiments of the present disclosure, Reaction 2 may result in the formation of a functionalize PBI polymer that includes zero, one, or two positively charged benzimidazole units. In some embodiments of the present disclosure, Reaction 2 may result in the formation of a functionalize PBI polymer that includes, zero, one, two, or three negatively charged sulfonic functional groups. In some embodiments of the present disclosure, a functionalize PBI polymer may include a first repeat unit having a positively charged benzimidazole unit and no negatively charged sulfonic group, but include a second repeat unit containing no positively charged benzimidazole unit but including a negatively charged sulfonic group.

In some embodiments of the present disclosure, a benzene ring may be bonded to the next repeat unit with the connecting bond positioned at the meta position. This first repeat unit is referred to herein as a meta-benzimidazole and the polymer constructed therefrom as a non-functionalized meta-polybenzimidazole polymer (meta-PBI polymer). In some embodiments of the present disclosure, a benzene ring may be bonded to the next repeat unit with the connecting bond positioned at the para position. This second repeat unit is referred to herein as a para-benzimidazole and the polymer constructed therefrom as a non-functionalized para-polybenzimidazole polymer (para-PBI polymer). The products of Reactions 1 and 2 illustrate that the repeat units of both starting polymers may be sulfonated and protonated upon exposure to a mixture of sulfuric acid and phosphoric acid at elevated temperature, resulting in charge-balanced protonated and sulfonated PBI polymers. In some embodiments of the present disclosure, m may be between about 2 and about 100, or between about 40 and about 70. In some embodiments of the present disclosure, n may be between about 2 and about 100, or between about 40 and about 70.

As shown in more detail below, and referring again to Reactions 1 and 2, in some embodiments of the present disclosure, a starting PBI polymer constructed of a repeat unit of at least one benzimidazole unit may be converted to a protonated and sulfonated PBI polymer, e.g., by immersing the starting PBI polymer in a sulfuric acid/phosphoric acid mixture at a temperature between about 120° C. and about 200° C. In some embodiments of the present disclosure, a starting PBI polymer may be a polymer constructed of both meta-benzimidazole and para-benzimidazole repeat units, which, upon exposure to a sulfuric acid/phosphoric acid solution is converted to a protonated and sulfonated PBI polymer. In some embodiments of the present disclosure, a starting PBI polymer and/or PBI polymer may be immersed in a sulfuric/phosphoric acid solution for a period of time between about 3 hour and about 24 hours. In some embodiments of the present disclosure, the solution may be prepared using a starting phosphoric acid solution at a concentration between about 50 wt % and about 100 wt. % $H_3PO_4$. In some embodiments of the present disclosure, the solution may be prepared using a starting sulfuric acid solution at a concentration between about 50 wt % and about 100 wt. % $H_2SO_4$. In some embodiments of the present disclosure, the solution may be prepared using a starting phosphoric acid solution at a concentration between about 50 wt % and less than 100 wt. % $H_3PO_4$. In some embodiments of the present disclosure, the solution may be prepared using a starting sulfuric acid solution at a concentration between about 50 wt % and less than 100 wt. % $H_2SO_4$.

Results and Discussion

Figure 1B:
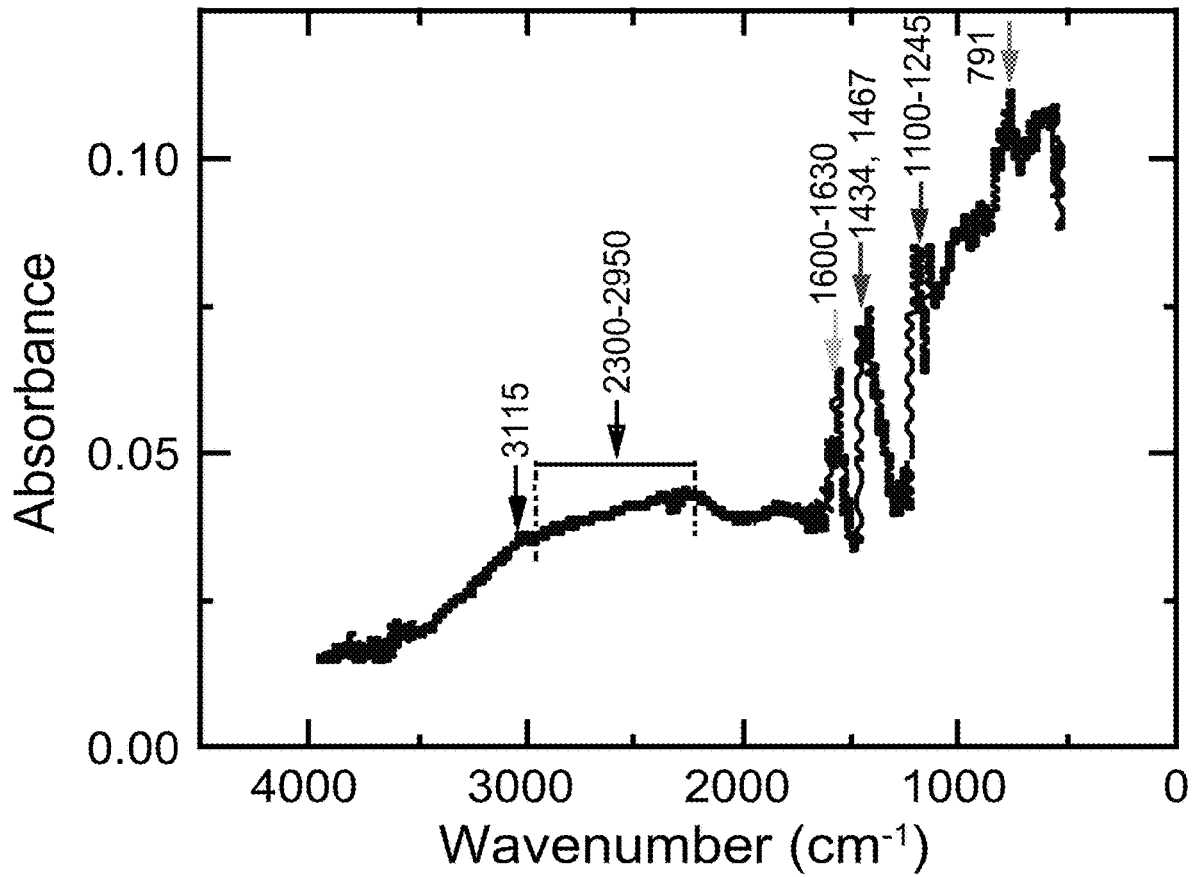
FIG. 1B illustrates an FTIR spectrum of $H_3PO_4$ functionalized PBI polymer, according to some embodiments of the present disclosure.
Figure 1C:
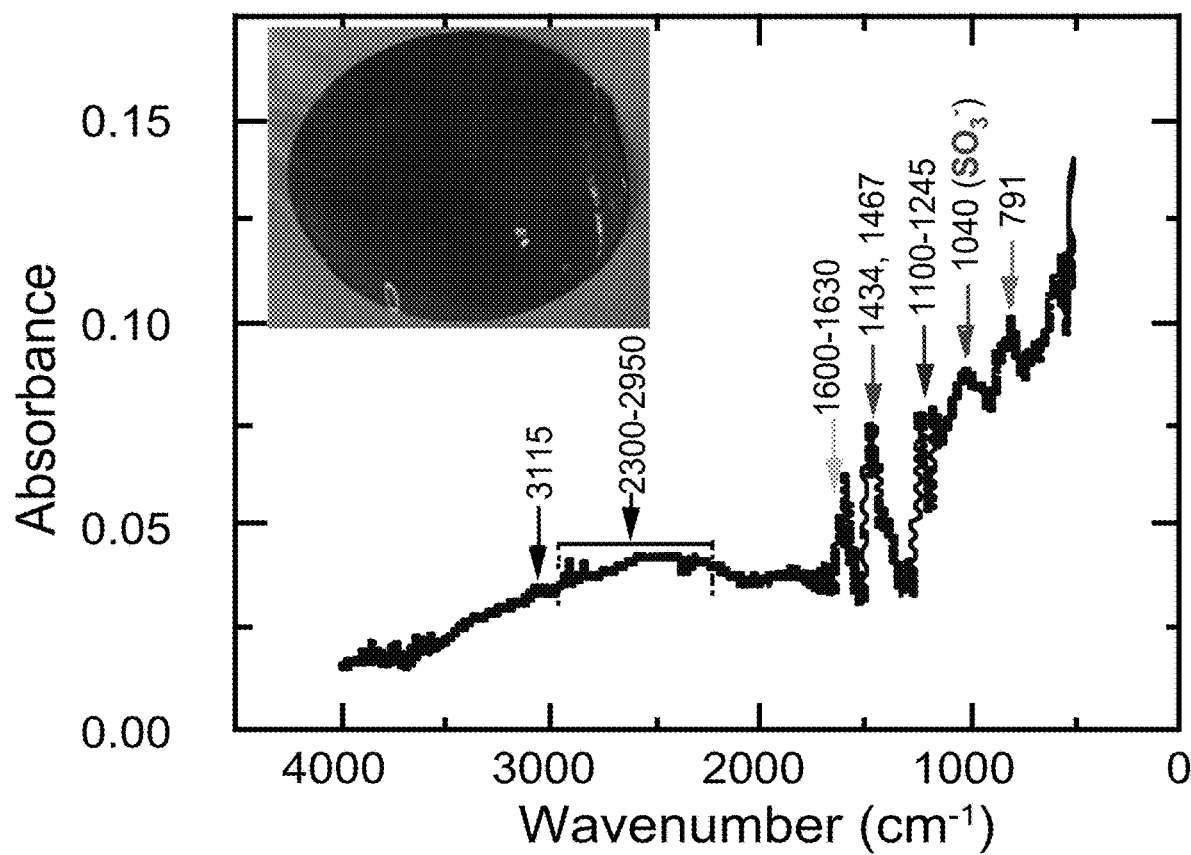
FIG. 1C illustrate an FTIR spectrum of $H_2SO_4$ functionalized PBI polymer, according to some embodiments of the present disclosure. The inset is a photograph of the functionalized PBI polymer.
Figure 1D:
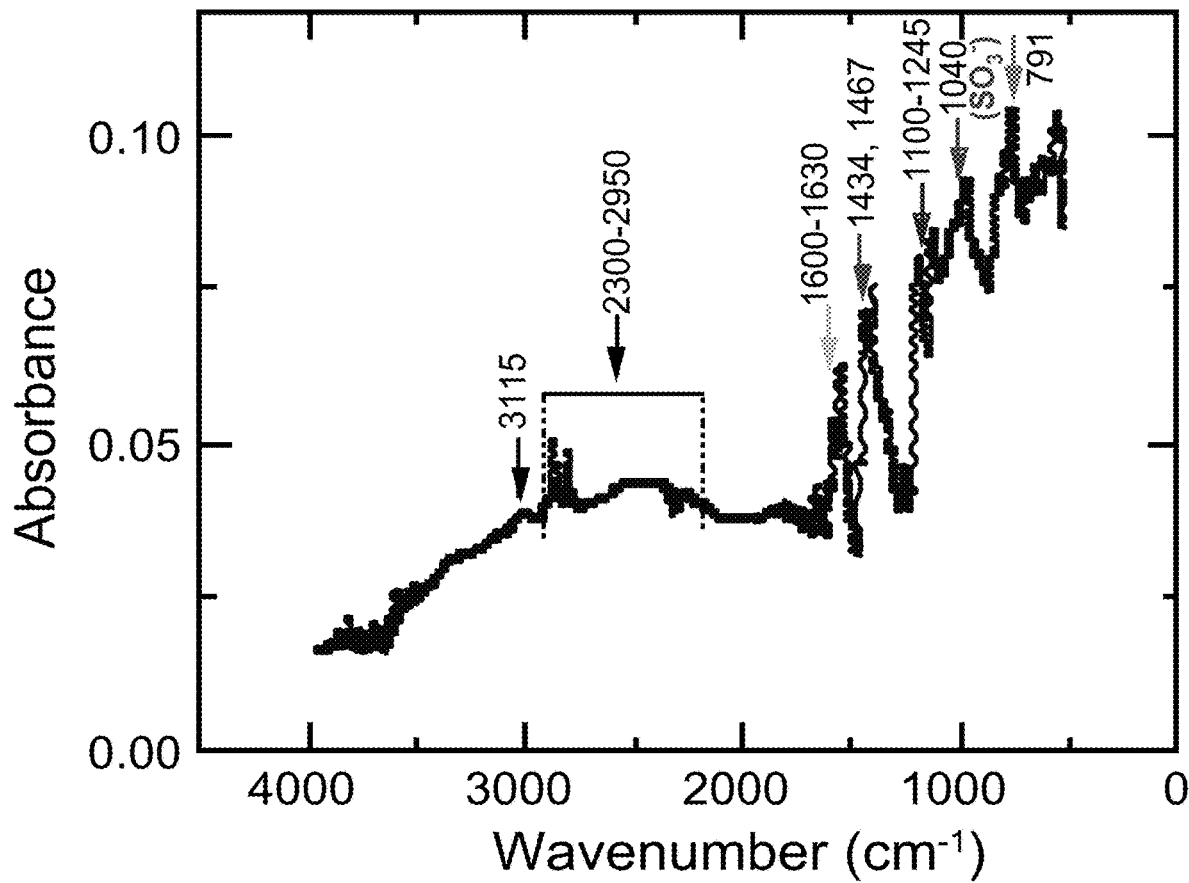
FIG. 1D illustrates an FTIR spectrum of a mixture of concentrated $H_3PO_4$ and $H_2SO_4$ functionalized PBI polymer, according to some embodiments of the present disclosure.

Fourier-Transform Infrared Spectroscopy (FTIR). FIGS. 1A-1D illustrate FTIR spectra of some PBI polymer samples (prior and after chemical treatment), according to some embodiments of the present disclosure. FIG. 1A illustrates the FTIR spectrum of unfunctionalized (as-received or starting) PBI polymer, FIG. 1B illustrates the FTIR spectrum of $H_3PO_4$-treated PBI polymer, FIG. 1C illustrates the FTIR spectrum of concentrated $H_2SO_4$-treated PBI polymer, and FIG. 1D illustrates the FTIR spectrum of a mixture of concentrated $H_3PO_4$— and $H_2SO_4$-treated PBI polymer. The FTIR spectra of all the PBI polymer samples, treated and untreated, clearly show characteristic bands consistent with the expected benzimidazole rings FTIR signatures in agreement with literature. More specifically, the following characteristic bands are present in all of the spectra: the IR band at 791 $cm^{-1}$ assigned to C—H out-of-plane deformation of benzene ring, the IR absorption band around 1100-1245 $cm^{-1}$ assigned to C—N stretching, the band at 1434 $cm^{-1}$ due to the absorption due to imidazole breathing mode, the band at 1467 $cm^{-1}$ for the in-plane deformation ring vibration of imidazole ring, and the IR absorption bands in the range 1600-1630 $cm^{-1}$ assigned to the stretching of imidazole C=N/C=C.

Referring again to FIG. 1A, the characteristic band that highlights the structural impact of functionalization is the IR absorption band at 3390 $cm^{-1}$, which is the stretching vibration of the non-hydrogen bonded N—H groups (i.e., free N—H) as expected for the unfunctionalized benzimidazole rings. Referring to FIGS. 1B-1D, the shift of this band to 3115 $cm^{-1}$, indicates successful protonation of the imidazole ring by acid treatment, i.e., a shift of IR absorption band at 3390 $cm^{-1}$ (isolated N—H stretching of the imidazole) to a broad IR band at 3115 $cm^{-1}$ (self-associated N—H bonds). The broadening of the IR absorption bands between 2300 and 2950 $cm^{-1}$ illustrated in FIGS. 1B-1D is attributed to $N^+$—H stretching mode, a further indication of protonation of nitrogen in imidazole rings. This protonation is caused by the combined $H_3PO_4$ and $H_2SO_4$ treatment of the starting PBI polymer. Of note are the more intense absorption bands in the range 500-1300 $cm^{-1}$ corresponding to the anions from the acids ($H_2PO_4$ or $SO_4^{2-}$), with the most intense bands illustrated in FIG. 1D due to the presence of anions from both $H_3PO_4$ and $H_2SO_4$ following the protonation step.

Comparing FIG. 1B ($H_3PO_4$-functionalized) and FIG. 1C ($H_2SO_4$-functionalized), the appearance of an additional absorption peak at 1040 $cm^{-1}$ is evident in FIG. 1C, which is attributed to the symmetric stretching vibration of the sulfonate group ($SO_3^-$). This indicates a successful sulfonation of the benzimidazole rings, as illustrated in Reactions 1 and 2 above. Two additional absorption peaks are evident in FIG. 1C; peaks at 2853 $cm^{-1}$ and 2918 $cm^{-1}$, which are assigned to symmetric C—H stretching and asymmetric C—H stretching, respectively, which also may arise due to sulfonation. Evidence of sulfonation is also provided in FIG. 1D (1040 $cm^{-1}$<$SO_3^->$) but with a reduction in the intensities of the absorption peaks at 2853 $cm^{-1}$ and 2918 $cm^{-1}$. It is important to mention that acid functionalization of PBI-polymer with a concentrated $H_2SO_4$ alone (see FIG. 1C) led to degradation of the starting unfunctionalized PBI polymer. However, its FTIR spectrum is valuable as a basis of comparison for successful sulfonation, especially when compared to the IR spectrum obtained when using a mixture of concentrated $H_3PO_4$ and $H_2SO_4$. Interestingly, a mixture of concentrated $H_3PO_4$ and $H_2SO_4$ was effective at enhancing high proton conductivity, with no observed degradation occurring to the starting PBI polymer.

In addition, the starting PBI polymers, as well as the functionalized PBI polymers resulting from the acid treating have excellent mechanical properties such as a Young's modulus of about 4.5 GPa, a tensile strength greater than about 150 MPa, a thermal stability up to temperatures exceeding 500° C., low creep, and high flexural strength. All of these attributes together make it possible to maximize the acid functionalization strategy to obtain high proton conductivity without compromising chemical and/or mechanical stability. Thus, in some embodiments of the present disclosure, a functionalize PBI polymer may have a Young's modulus between about 1.0 GPa and about 10 GPa, or between about 3.0 GPa and 6.0 GPa. In some embodiments of the present disclosure, a functionalize PBI polymer may have a tensile strength between about 10 MPa and about 200 MPa, or between about 100 MPa and 200 MPa.

Ion-Exchange Capacity, Water Uptake, and Hydration Number. Table 1 below summarizes ion-exchange capacity (IEC), water uptake ($\varphi$), and hydration number ($\lambda$) data of two sets of independently prepared mixed-acid $H_3PO_4$/$H_2SO_4$ treated PBI polymer layers (i.e., membranes) and, for comparison, Nafion® layers, including the swelling ratio (thickness and length) and dimensional change. The ion-exchange capacity obtained from acid-base titration represents the total functional groups (active sites) in a membrane and it is an important metric for ion conductivity. For PBI polymers, the sulfonic acid groups in acid-functionalized PBI polymers are at least partly responsible for the obtained IEC. The IEC values for both Nafion® layers and PBI polymer layers are highly reproducible, and the value obtained for Nafion® is in good agreement with reported data. The PBI polymer IEC values are somewhat higher compared to Nafion®, which may indicate more available sites for ion conductivity as a result of acid functionalization. However, the water uptake and hydration number (number of moles of water per equivalent of polymer) are higher for the Nafion® layers than the PBI polymer layers.

Figure 2A:
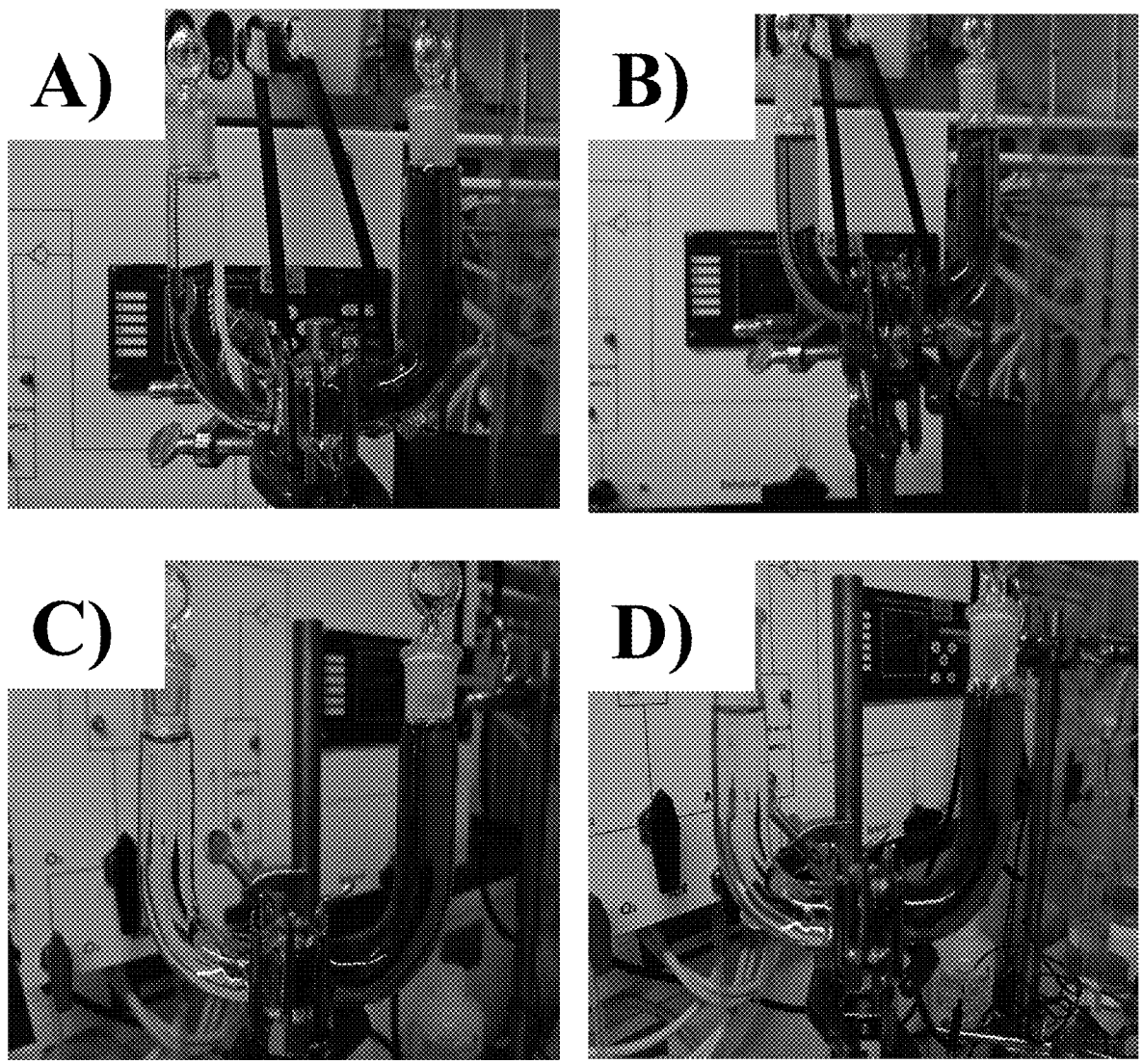
FIG. 2A illustrates photographs of a diffusion cell showing vanadium ion diffusion through A) Nafion®: at zero hours, B) Nafion®: after 20 days, C) functionalized PBI polymer: at zero hours, D) functionalized PBI-polymer: after 20 days, according to some embodiments of the present disclosure.
Figure 2B:
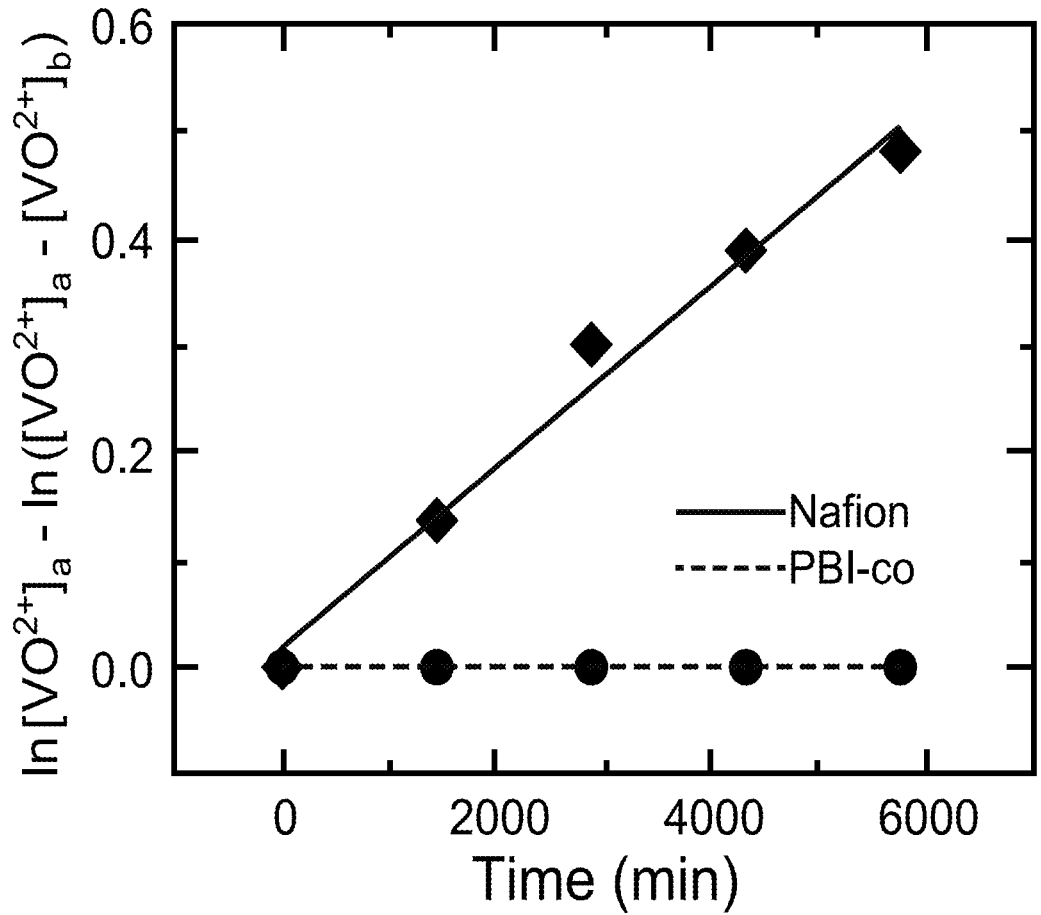
FIG. 2B illustrates UV-vis of vanadium concentration as a function of time, according to some embodiments of the present disclosure. Subscripts a and b represent vanadium ion concentration in vanadium-rich half-cell and blank half-cell, respectively. See FIG. 22 for the UV-vis spectrum of vanadium ion diffusion through Nafion and functionalized PBI-polymer.
Figure 3:
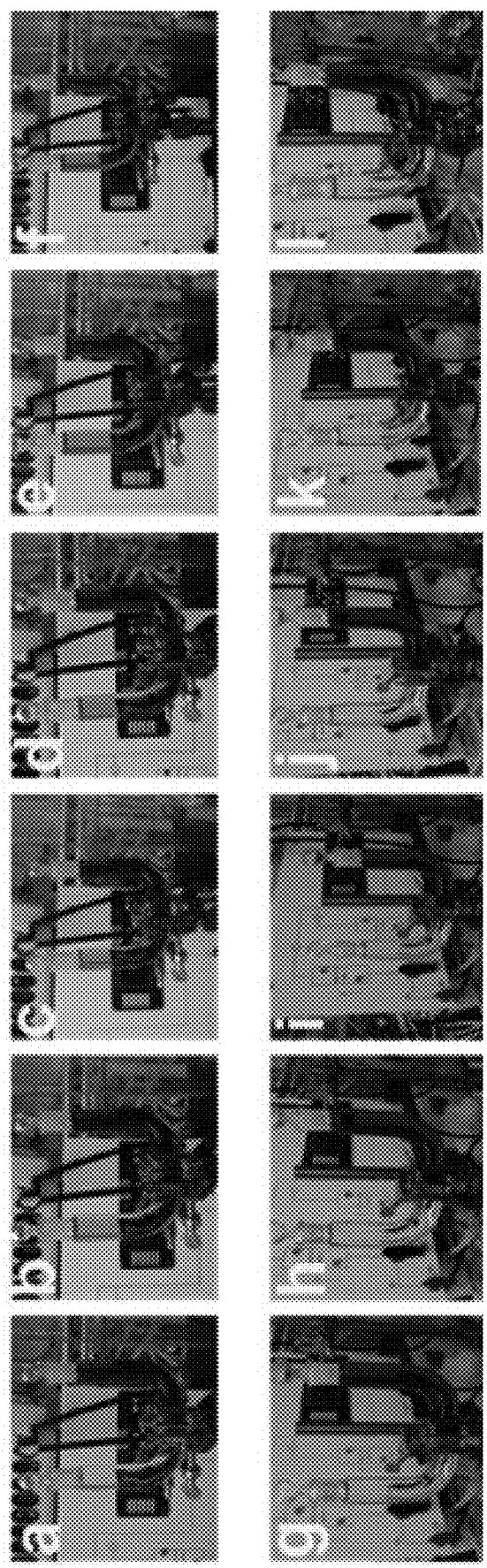
FIG. 3 illustrates photographs of vanadium ion crossover in a diffusion cell, according to some embodiments of the present disclosure. Top row: Nafion® membrane (a) $1^{st}$ day, (b) $4^{th}$ day, (c) $8^{th}$ day, (d)$_{12}$th day, (e) $16^{th}$ day, and (f) $20^{th}$ day; bottom row: functionalized PBI-polymer (g) $1^{st}$ day, (h) $4^{th}$ day, (i) $8^{th}$ day, (j) $12^{th}$ day, (k) $16^{th}$ day, and (l) $20^{th}$ day. The vanadium-rich half-cell was filled with 18 mL of 1.0 M $VOSO_4$+2.0 M $H_2SO_4$, and the blank half-cell was filled with 18 mL of 1.0 M $MgSO_4$+2.0 M $H_2SO_4$. The geometric area of the cell is ca. 1.27 cm$^2$.

While high water uptake may be beneficial for membrane swelling (against membrane drying out) and aid in the formation of continuous proton conducting domains (for device such as fuel cells), it may be less critical for redox flow batteries (RFBs) that utilize aqueous electrolyte containing aqueous ionic species that can help bridge conducting domains. In fact, PBI polymers with low water uptake/hydration number may be advantageous for RFBs by reducing crossover. The swelling ratio (in thickness) of acid-functionalized PBI polymers was a factor of 9 higher than that of Nafion® following acid treatment (see Table 1). However, the swelling ratio (in length 3%) and dimensional change (3%) for acid-functionalized PBI polymers are much smaller than that of Nafion® membrane (13% and 10%, respectively), suggesting more dimensional stability for PBI polymer layers compared to Nafion® layers.

efficiency. Vanadium flux was measured using methods known in the field. FIGS. 2A and 2B present the results of vanadium ion permeation through individual Nafion® layers and PBI polymer membranes. The vanadium-rich diffusion cell utilized in these experiments initially contained a solution of vanadium electrolyte in acid (1M $VOSO_4$+2M $H_2SO_4$), while the initially vanadium-free side, contained a solution of magnesium electrolyte (blank half-cell) in acid (1M $MgSO_4$+2M $H_2SO_4$). Electrolyte volume and ionic strength were the same in both half-cells, to minimize osmotic pressure effects that may create water imbalance or convective-induced crossover due to flux from an osmotic pressure gradient. Vanadium concentration in the vanadium-rich cell and the blank half-cell were monitored over a duration of 20 days (see FIG. 3), and from this a vanadium flux across the membrane was calculated. Vanadium concentrations in the two half-cells were analyzed using Nanodrop UV-vis spectrophotometry. Panels A) and B) of FIG. 2A illustrate a clear change in color intensity in the blank half-cell, indicative of $VO^{2+}$ ion diffusion through Nafion® membrane over the 20-day experiment. However, the mixed-acid $H_3PO_4$/$H_2SO_4$-treated, acid-functionalized PBI polymer eliminated vanadium ion diffusion crossover (see Panels C) and D) of FIG. 2A) with no evidence of color change that may signal vanadium crossover. FIG. 2B illustrates the UV-vis spectrum of vanadium ion diffusion through Nafion® layers and acid functionalized PBI layers. As expected, the UV-vis spectrum clearly shows significant $VO^{2+}$ ion absorption peaks for Nafion® but no observable absorption peak for functionalized PBI polymers.

From UV-vis data vanadium permeability was calculated using Equation (1):

$$\ln(VO^{2+})_a - \ln([VO^{2+}]_a - [[VO^{2+}]_b]) = \frac{DAt}{LV_b} \qquad \text{Eq. (1)}$$

where $[VO^{2+}]_a$=vanadium concentration in the vanadium rich-cell (mol $L^{-1}$), $[VO^{2+}]_b$=vanadium concentration in the blank half-cell (mol $L^{-1}$), D=diffusion coefficient ($cm^2$ $min^{-1}$), A=membrane area ($cm^2$), t=time (min), L=membrane thickness (cm), and $V_b$=electrolyte volume in the blank half-cell ($cm^3$). By plotting the left-hand side of Equation (1) against time, a linear curve is obtained, as expected for Fickian diffusion. Vanadium permeability, obtained from the slope of the curve, is ca. $5.67 \times 10^{-6}$ $cm^2$ $min^{-1}$ for the Nafion® membrane and vanadium concentration being about $2.7 \times 10^{-1}$ M at the end of 20 days. In contrast, vanadium concentration (and hence vanadium per-

TABLE 1

Ion-exchange capacity, water uptake, hydration number, swelling ratio, and dimensional change of PBI-polymer and Nafion ® membranes

| Membrane | IEC (meq $g^{-1}$) | Water uptake $\varphi$ (%) | Hydration number $\lambda$ | Swelling ratio length (%) | Swelling ratio thickness (%) | Dimensional change (%) |
|---|---|---|---|---|---|---|
| Nafion ® membrane | 0.94 (0.94) | 32.65 (30.35) | 19 (18) | 13 | 6 | 10 |
| PBI-co[a] | 2.75 (2.72) | 22.72 (22.26) | 5 (5) | 3 | 55 | 3 |

[a]PBI-co functionalized with a mixture of concentrated phosphoric and sulfuric acids. The values in parentheses are the data obtained for the second set of samples.

Vanadium Permeability in Diffusion Cell. Ion flux (other than protons) through RFB membranes should be prevented as it may lead to battery self-discharge and loss in coulombic meability) for functionalized PBI polymers remained below detection limits (see FIG. 2B) for the 20 days studied (the limit of detection is $10^{-4}$ M). However, based on UV-vis detection limit ($10^{-4}$ M) of the instrument vanadium permeability for mixed-acid $H_3PO_4/H_2SO_4$-treated, functionalized PBI polymer presumably is ca. $1.97 \times 10^{-9}$ $cm^2$ $min^{-1}$ as the upper limit and the permeability is potentially below this value. Thus, the functionalized PBI polymer layers mitigate vanadium ion diffusion crossover by at least three orders of magnitude in permeability selectivity as compared to Nafion® based on the permeability upper limit, and can strongly benefit RFBs by acting as a much more effective barrier for cross-species diffusion crossover.

Figure 4A:
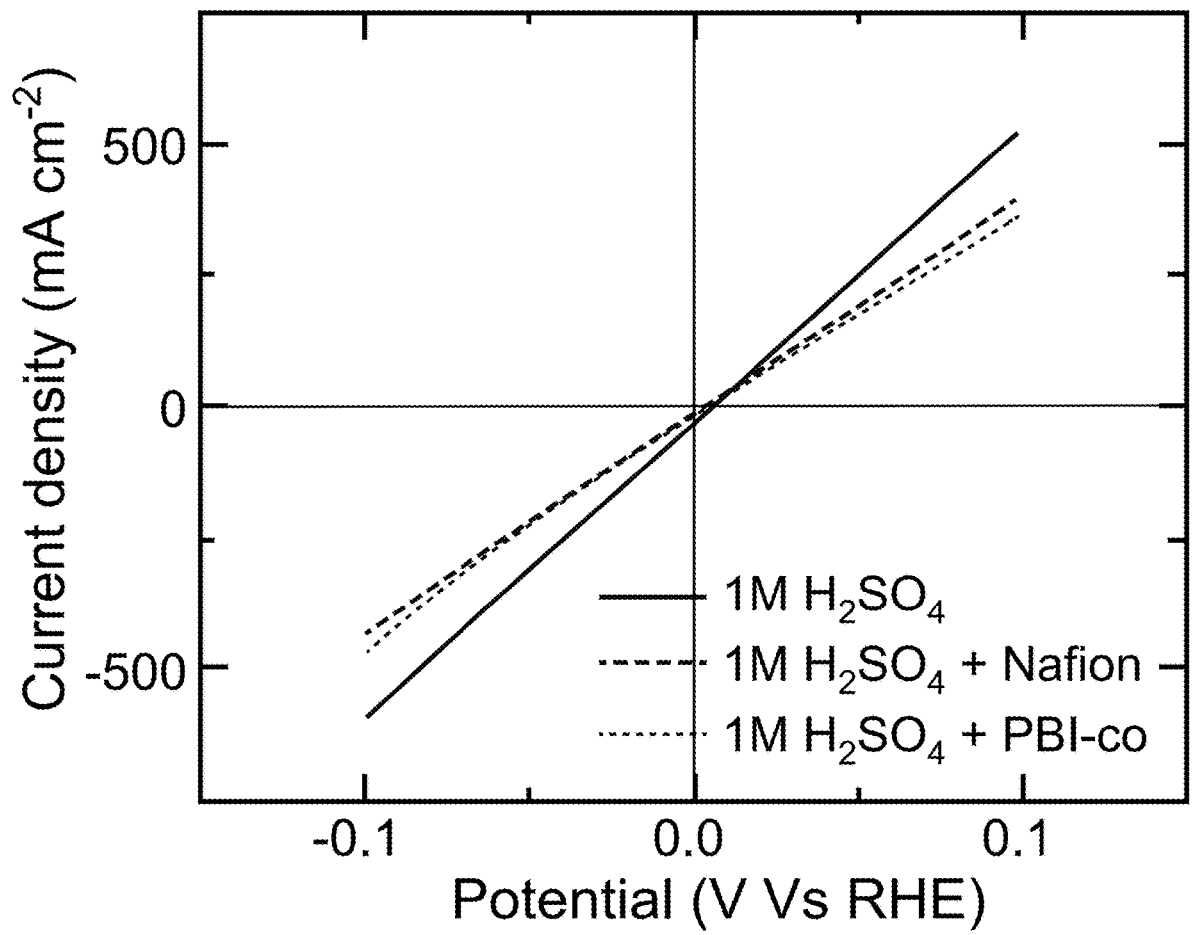
FIG. 4A illustrates current-potential (I-V) curves in an electrically driven four-point probe cell for proton and vanadyl ion transmission through Nafion® and functionalized PBI polymer membranes in 1M $H_2SO_4$, according to some embodiments of the present disclosure.
Figure 5:
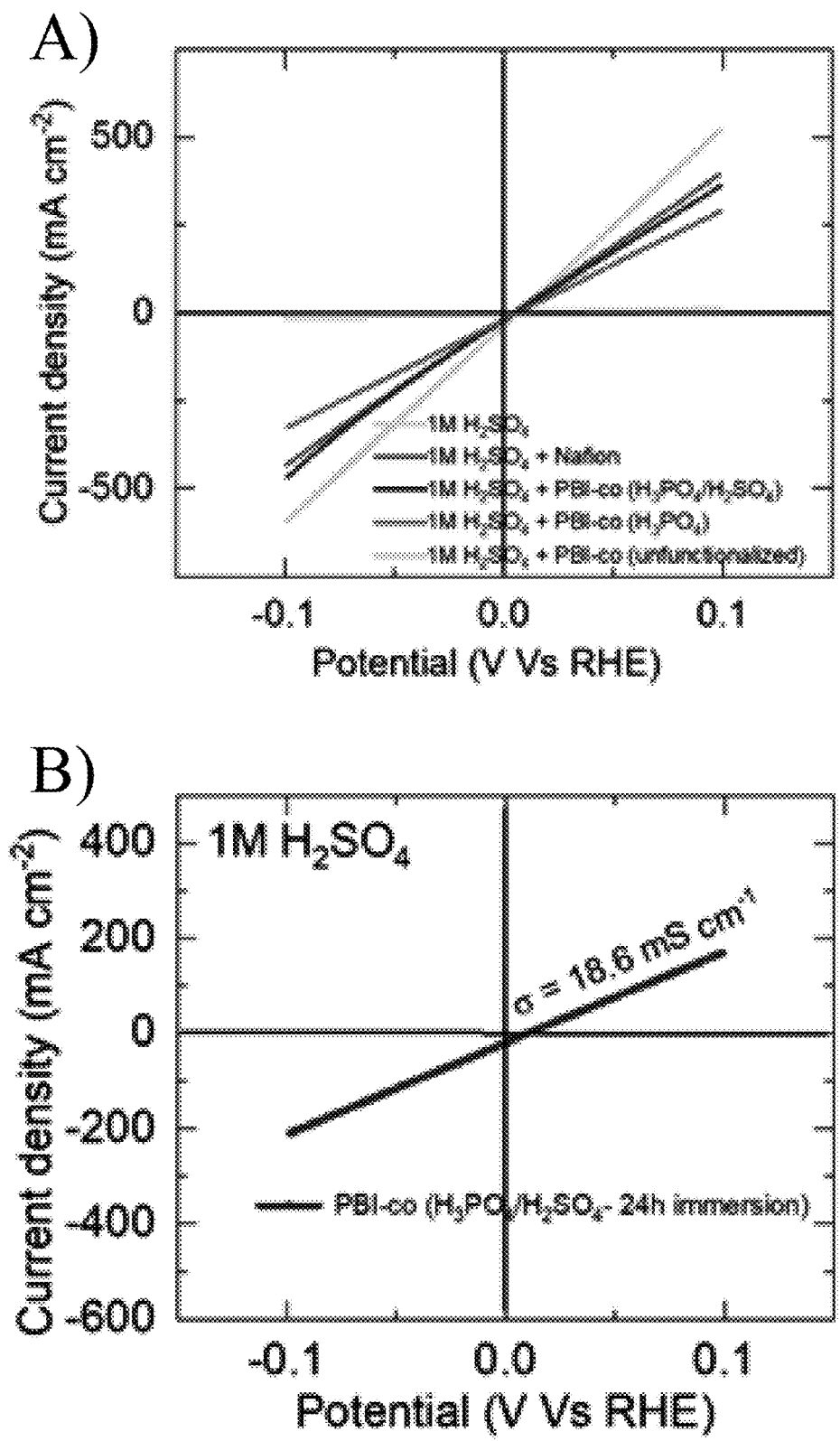
FIG. 5 illustrates current-potential (I-V) curves acquired from a four-point probe electrically driven cell comparing ionic resistance of Nafion®, both functionalized and unfunctionalized PBI-polymer in 1.0 M $H_2SO_4$ electrolyte, according to some embodiments of the present disclosure.

Conductivity. FIGS. 4A-4D illustrate current-potential (I-V) curves in an electrically driven four-point probe cell for proton and vanadium ion transmission through Nafion® layers and mixed-acid $H_3PO_4/H_2SO_4$-treated, functionalized PBI polymer layers using a direct current (DC) pulse technique (see FIG. 5 for the I-V curves for concentrated $H_3PO_4$ treated and unfunctionalized PBI-polymer membranes). In this DC technique, proton conductivity was probed by utilizing an electrically driven four-point probe electrochemical cell, with membranes in direct contact with 1M $H_2SO_4$ electrolyte. A very small potential bias, ranging from −100 to +100 mV was applied across the cell using a slow scan linear sweep voltammetry. Conductivity values were obtained from the slopes of the I-V curves and are summarized in Table 2. The unfunctionalized starting PBI polymer exhibited the lowest proton conductivity (0.5 mS $cm^{-1}$) following correction from the contribution of electrolyte resistance. No meaningful IEC was measured in these samples, which again agrees well with the electrochemical data-absence of ion-conducting sites in the polymers native state. Acid functionalization of PBI polymers using only concentrated $H_3PO_4$ increased the conductivity to 39 mS $cm^{-1}$ and an even higher conductivity of ~138 mS $cm^{-1}$ was obtained using mixed-acid $H_3PO_4/H_2SO_4$ treating to functionalize (i.e., sulfonate and protonate) the starting PBI polymers. These results indicate that protonation and sulfonation of benzimidazole rings are convenient routes to anchor highly active proton-conducting sites to the starting PBI polymers.

port limited) or electrochemical kinetics factors, which are usually associated with nonlinear dependence of current on applied potential. FIG. 4A illustrates the I-V curves acquired in 1M $H_2SO_4$. Ionic resistance to proton transport in both Nafion® layers and functionalized PBI polymer layers are very close and are larger than the resistance with no membrane. The higher resistance observed when a membrane is placed in the cell (compared with no membrane) is consistent with the observation that ionic conductivity of a membrane is always lower than the conductivity of the equivalent volume of the aqueous electrolyte it displaced. The minor change in I-V slope for functionalized PBI-polymer, relative to Nafion®, indicates similar proton transmission for both membranes.

Figure 4B:
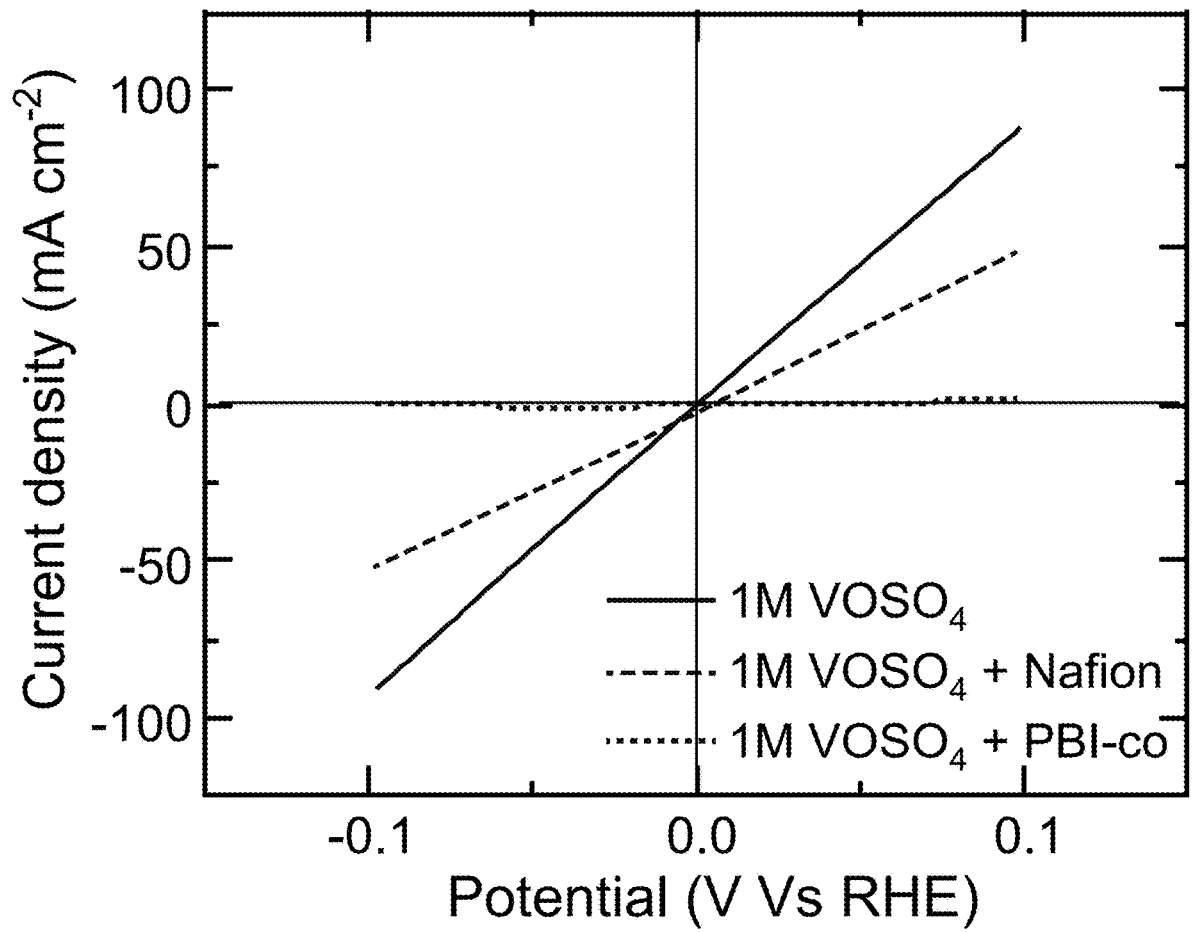
FIG. 4B illustrates current-potential (I-V) curves in an electrically driven four-point probe cell for proton and vanadyl ion transmission through Nafion® and functionalized PBI polymer membranes in 1M $VOSO_4$, according to some embodiments of the present disclosure.

Referring to FIG. 4B, vanadium ion transport presents a stark difference to the I-V curves illustrated in FIG. 4A. First, with no membrane present, the overall current density illustrated in FIG. 4B (ca. 90 mA $cm^{-2}$) is a factor of 7 lower than that illustrated FIG. 4A (~600 mA $cm^{-2}$), consistent with the lower ionic conductivity of 1M $VOSO_4$ (ca. 50 mS $cm^{-1}$ at RT), relative to 1M $H_2SO_4$ (ca. 368 mS $cm^{-1}$ at RT). Similarly, comparing the current densities from the I-V curves of vanadium ion transport (see FIG. 4B) to proton transport (see FIG. 4A) through Nafion® membrane is a factor of about 10. This ratio agrees well with the fact that Nafion® selectivity for proton to divalent cations (e.g., $VO^{2+}$) is about 10:1, and represents an upper bound of selectivity that can be achieved with PFSA membranes (e.g., Nafion®). An important finding from the conductivity studies is the selectivity for proton transport over vanadium transport through the functionalized PBI-polymer membrane (see FIG. 4A vs. FIG. 4B). The I-V curve for vanadium ion transport through functionalized PBI polymer layers is almost at the origin of the current density axis. In fact, no significant current was acquired for vanadium ion transport. Like Nafion® membranes, functionalized PBI polymer layers are an excellent proton conductor, but unlike Nafion®, functionalized PBI polymers are a near perfect barrier to vanadium ion transport. This finding corroborates the permeability studies.

TABLE 2

Resistances and conductivities of proton and vanadium ion through functionalized PBI-polymer and Nafion ® membranes

|  | Resistance (corr) | ASR[a] | Conductivity (through-plane) (DC current pulse) 5 $cm^{-2}$ | Conductivity (in-plane) (AC impedance)[b] 5 $cm^{-1}$ | Wet thickness[c] μm |
|---|---|---|---|---|---|
| Sulfuric acid | Ω | Ω $cm^2$ |  |  |  |
| Nafion-211 (x2) | 0.049 ± 0.01 | 0.062 ± 0.01 | 0.086 |  | 53 |
| PBI-co ($H_3PO_4/H_2SO_4$) | 0.035 ± 0.01 | 0.045 ± 0.01 | 0.138 | 0.136 | 62 |
| PBI-co ($H_3PO_4$) | 0.080 ± 0.04 | 0.102 ± 0.05 | 0.058 |  | 59 |
| PBI-co (unfunctionalized) | 7 ± 0.04 | 9 ± 0.05 | $0.52 \times 10^{-3}$ | $0.39 \times 10^{-3}$ | 47 |
| Vanadyl sulfate |  |  |  |  |  |
| Nafion-211 (x2) | 0.687 ± 0.01 | 0.873 ± 0.01 | 0.006 |  | 54 |
| PBI-co ($H_3PO_4/H_2SO_4$) | 987 ± 0.41 | 1254 ± 0.5 | $5 \times 10^{-6}$ |  | 62 |

[a]ASR = Area specific resistance.
[b]AC impedance conductivity data were acquired at 30° C. and 95% RH.
[c]Samples were immersed in 1.0M $H_2SO_4$ and 1.0M $VOSO_4$ following acid functionalization (for PBI-co) to determine the appropriate wet thickness. The raw data of the measured resistances are presented in Table S1. Concentrated $H_2SO_4$ functionalized PBI-co sample was not studied because it caused membrane degradation.

Figure 4C:
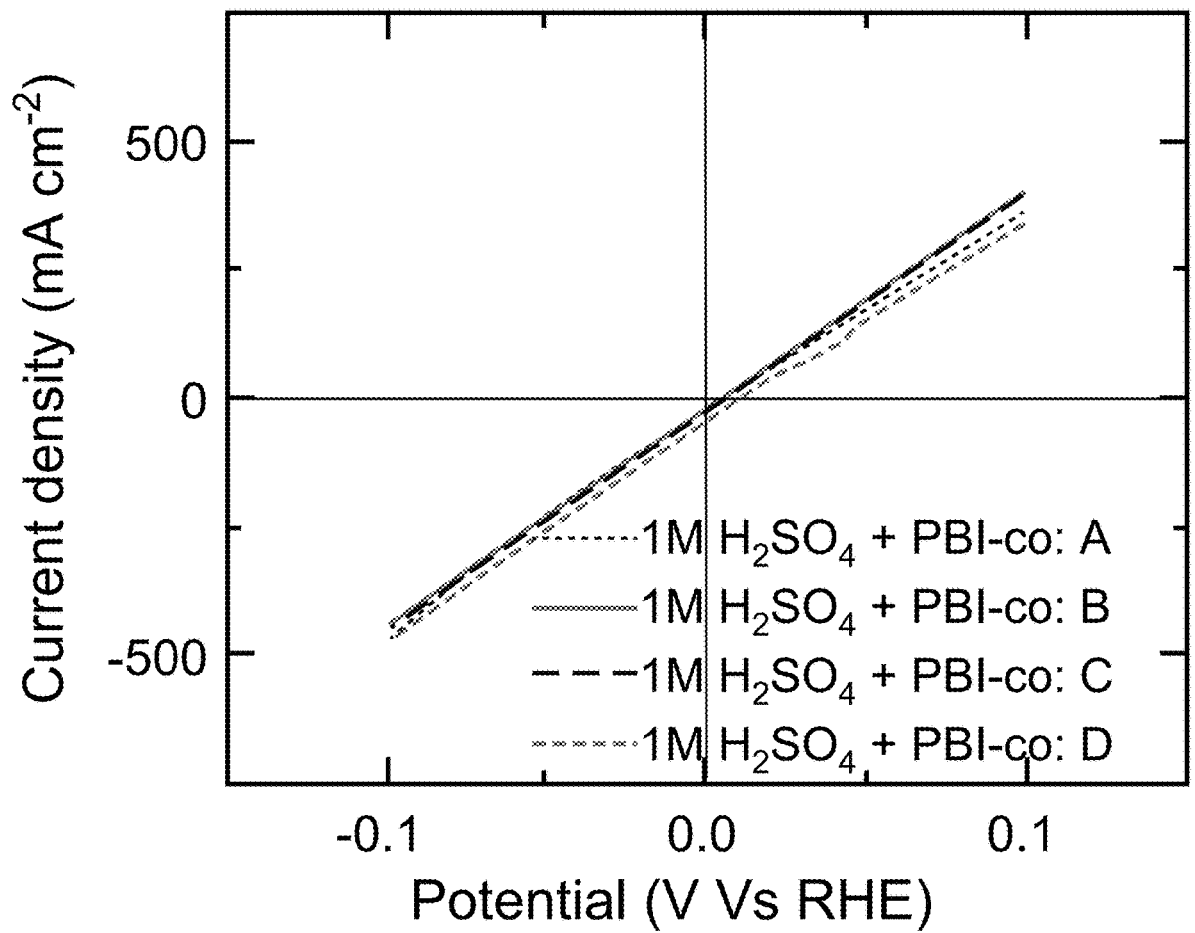
FIG. 4C illustrates current-potential (I-V) curves in an electrically driven four-point probe cell for proton and vanadyl ion transmission through Nafion® and functionalized PBI polymer membranes reproducibility studies on four similarly prepared functionalized PBI-polymer membranes, according to some embodiments of the present disclosure.
Figure 4D:
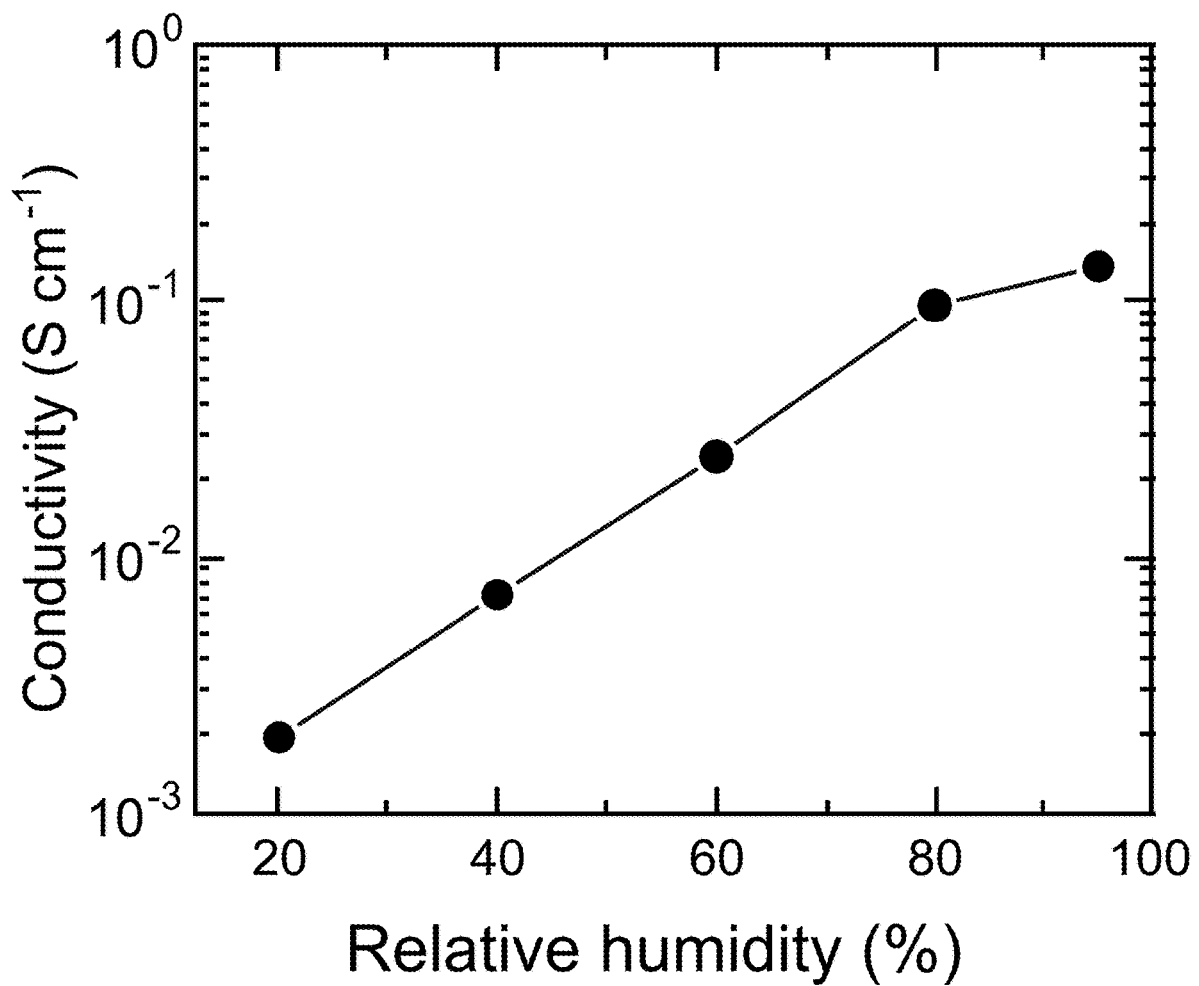
FIG. 4D illustrates in-plane AC impedance conductivity measurement of functionalized PBI-polymer membrane as a function of RH, according to some embodiments of the present disclosure.

FIGS. 4A-4C illustrate I-V curves for proton or vanadium ion transmission through functionalized PBI polymer layers and Nafion® layers in 1M $H_2SO_4$ and 1M $VOSO_4$. All I-V curves are linear with respect to applied bias, indicative of a current limitation by ohmic factors (ion transmission resistance through membrane) and not by diffusion (trans- FIG. 4C illustrates results from reproducibility studies on proton conduction of the four different independently functionalized PBI polymer layers (i.e., membranes) (sample A-D) that were prepared identically. These samples show high reproducibility for proton conduction with almost identical I-V curves, all ca. 138 mS $cm^{-1}$. To further confirm the observed high proton conductivity of functionalized PBI polymers, an AC electrochemical impedance technique in an in-plane mode was used to estimate proton conductivity at 30° C. as a function of RH (see FIG. 4D). At 95% RH, proton conductivity recorded was about 136 mS cm$^{-1}$. This conductivity value is in good agreement with ~138 mS cm$^{-1}$ obtained from through-plane DC conductivity in 1M H$_2$SO$_4$. The statistical data from FIGS. 4A-4D are summarized in Table 2 above, which considers the average resistance from two independent measurements and the corresponding standard deviation. The corrected resistances are obtained by a simple subtraction of electrolyte resistance from membrane resistance. Upon normalization with the membrane cross-sectional area (1.27 cm$^2$) in contact with the electrolyte gives the area-specific resistance (ASR). Consequently, conductivity was estimated from ASR considering the wet thickness of the membrane (~62 µm for functionalized PBI polymer and ~53 µm for Nafion®). The general trend in conductivity is as expected from the I-V curves.

As previously noted, one may estimate ion selectivity based on permeability and conductivity. Permeability is obtained from measurements that can be correlated with vanadium ion permeability. With proton conductivity of 86 mS cm$^{-1}$ and a permeability value of 5.67×10$^{-6}$ cm$^2$ min$^{-1}$, Nafion® has an ion selectivity of 1.5×10$^4$ S min cm$^{-3}$. The ion selectivity of functionalized PBI polymers based on permeability may be indirectly estimated from UV-vis detection limit (serving as upper limit value). With proton conductivity of 138 mS cm$^{-1}$, and permeability of 1.97×10$^{-9}$ cm$^2$ min$^{-1}$ (obtained using detection limit of 10$^{-4}$ M), functionalized PBI polymer has an ion selectivity of 7.0×10$^7$ S min cm$^{-3}$. The functionalized PBI polymer layer ion selectivity is at least three orders of magnitude higher than the Nafion® layer. Alternatively, one may directly estimate ion selectivity based on conductivity of proton relative to vanadium ion transmission. From Table 2, vanadium ion (VO$^{2+}$) conductivity in Nafion® is ~6 mS cm$^{-1}$ in 1.0 M VOSO$_4$ electrolyte, whereas proton conductivity is ~86 mS cm$^{-1}$, thus, Nafion® ion selectivity for proton transmission over vanadium ion is about one order of magnitude. In contrast, ion selectivity of functionalized PBI polymer for proton transport is several thousand times higher than that for the vanadium ion, i.e., about 4 orders of magnitude (0.138 S cm$^{-1}$<H$^+$>vs. 5×10$^{-6}$ S cm$^{-1}$<VO$^{2+}$>, see Table 2). The obtained selectivity implies that functionalized PBI-polymer can simultaneously provide high proton conduction and act as an effective barrier to vanadium ion crossover-ideal properties for an ion-exchange membrane. In some embodiments of the present disclosure, acid-functionalized PBI-polymer membranes may need an acidic medium as ion-conducting bridges/domains, which may lead to the formation of a cationic ionene-polybenzimidazolium backbone following protonation that may facilitate high proton transport (but blocks vanadium ion transport through Donnan exclusion) and also through diffusion of sulfate moieties. Without the acidic medium (e.g., in H$_2$O), the membrane may have low proton conductivity.

Figure 6A:
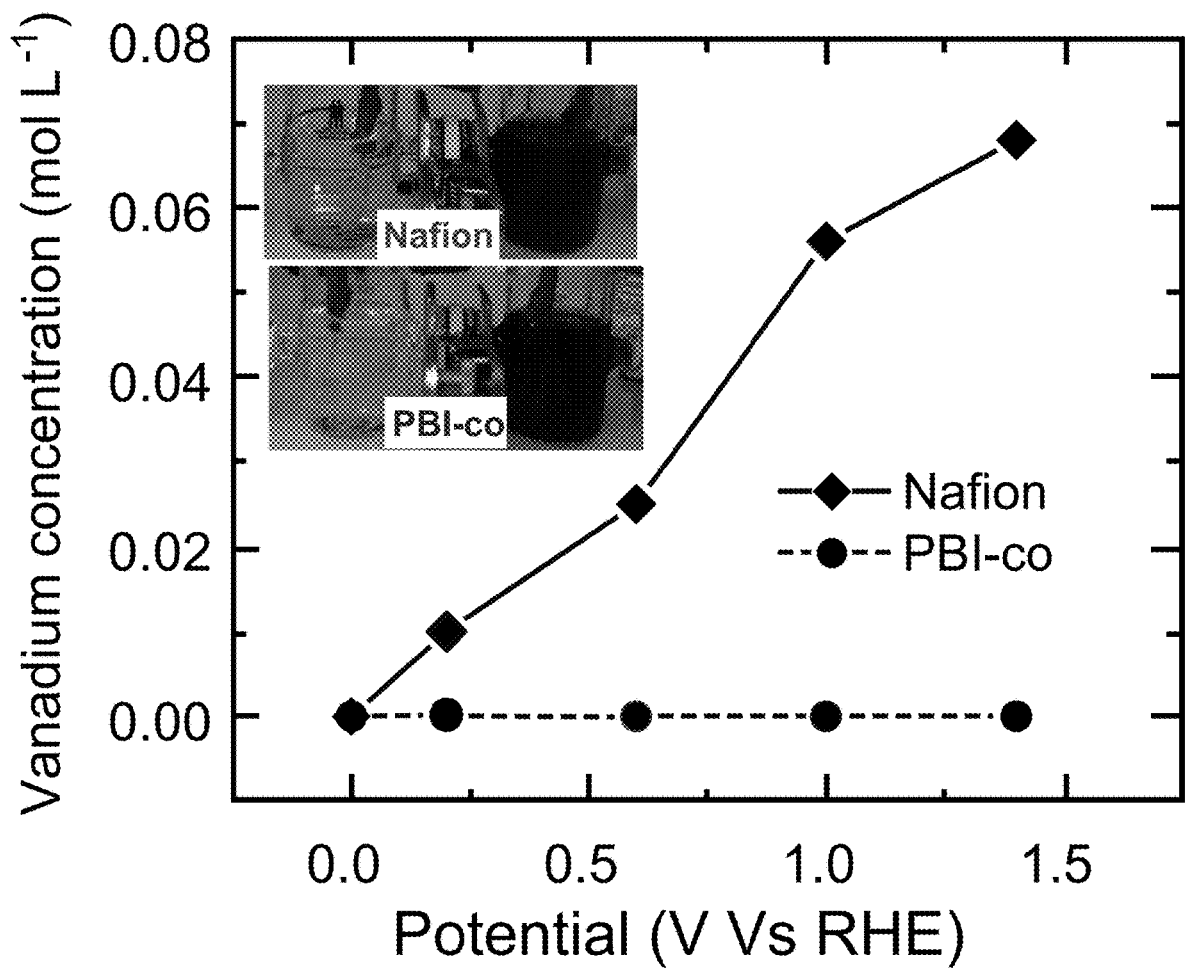
FIG. 6A illustrates UV-vis spectrophotometric analysis of vanadium ion concentration in the blank half-cell for Nafion® and functionalized PBI polymer membranes plot of vanadium ion concentration against applied potential, according to some embodiments of the present disclosure. The insets are the photographs of the cell after 1.4 V was applied for 1 hour that show crossover in Nafion® but zero crossover in functionalized PBI polymer membrane.
Figure 6B:
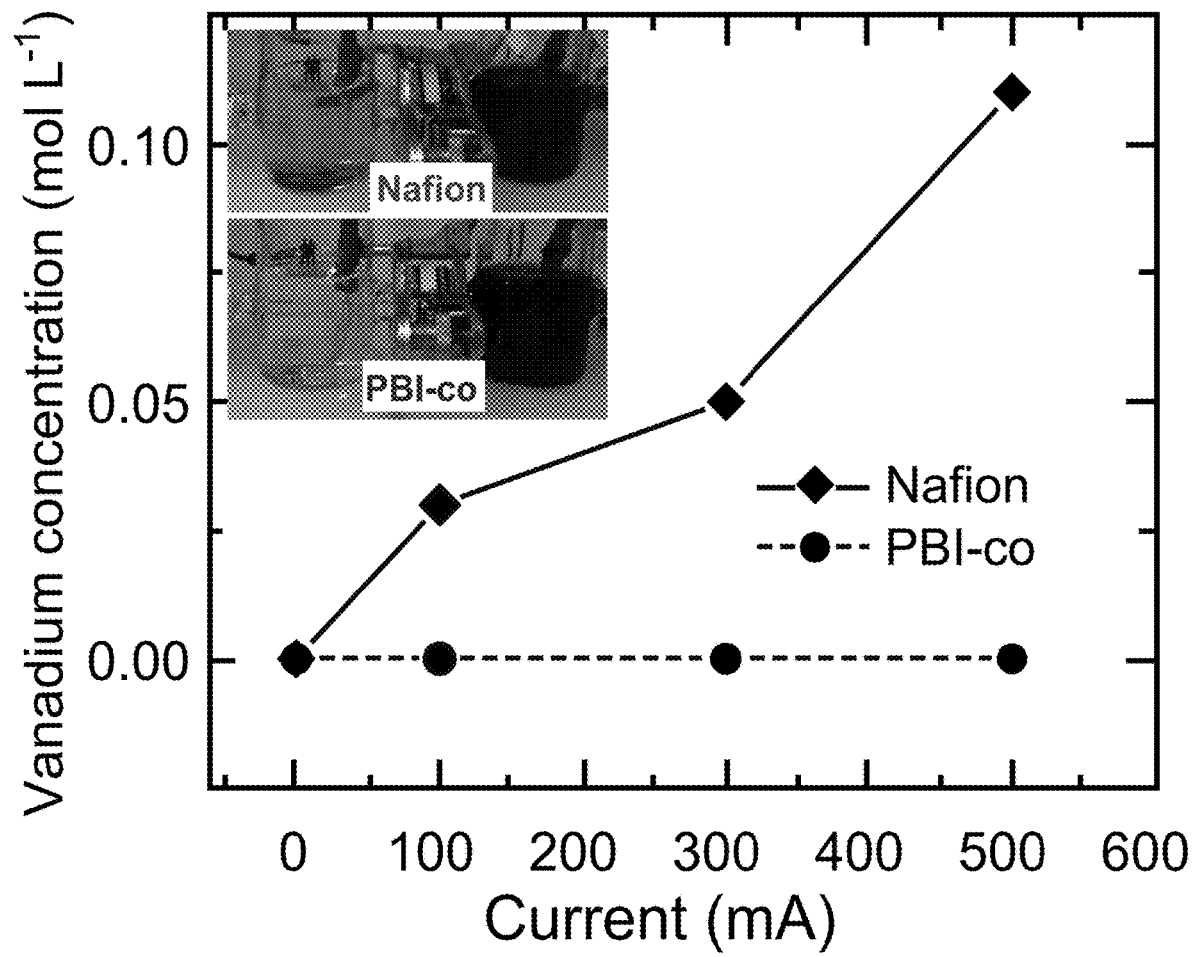
FIG. 6B illustrates UV-vis spectrophotometric analysis of vanadium ion concentration in the blank half-cell for Nafion® and functionalized PBI polymer membranes plot of vanadium ion concentration against applied current, according to some embodiments of the present disclosure. The insets are the photographs of the cell after 500 mA was applied for 1 hour that show crossover in Nafion® membrane but zero crossover in functionalized PBI polymer.
Figure 7:
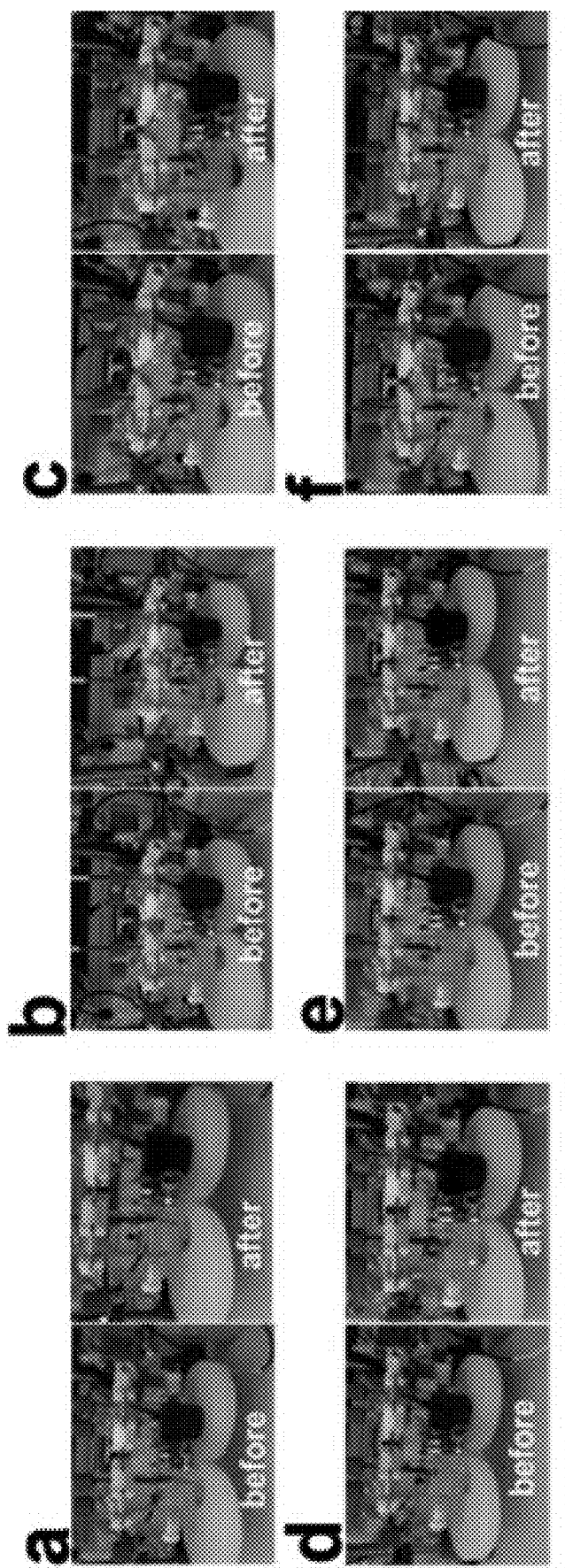
FIG. 7 illustrates photographs of cells showing vanadium electromigration crossover under applied current, according to some embodiments of the present disclosure. Top row: Nafion® membrane (a) before/after—100 mA, (b) before/after—300 mA, (c) before/after—500 mA, and bottom row: functionalized PBI-polymer (d) before/after—100 mA, (e) before/after—300 mA, and (f) before/after—500 mA. The geometric area of the cell in contact with the electrolyte is ca. 1.27 cm$^2$. The vanadium-rich half-cell was filled with 50 mL of 1.0 M $VOSO_4$+2.0 M $H_2SO_4$, and the blank half-cell was filled with 50 mL of 1.0 M $MgSO_4$+2.0 M $H_2SO_4$.
Figure 8:
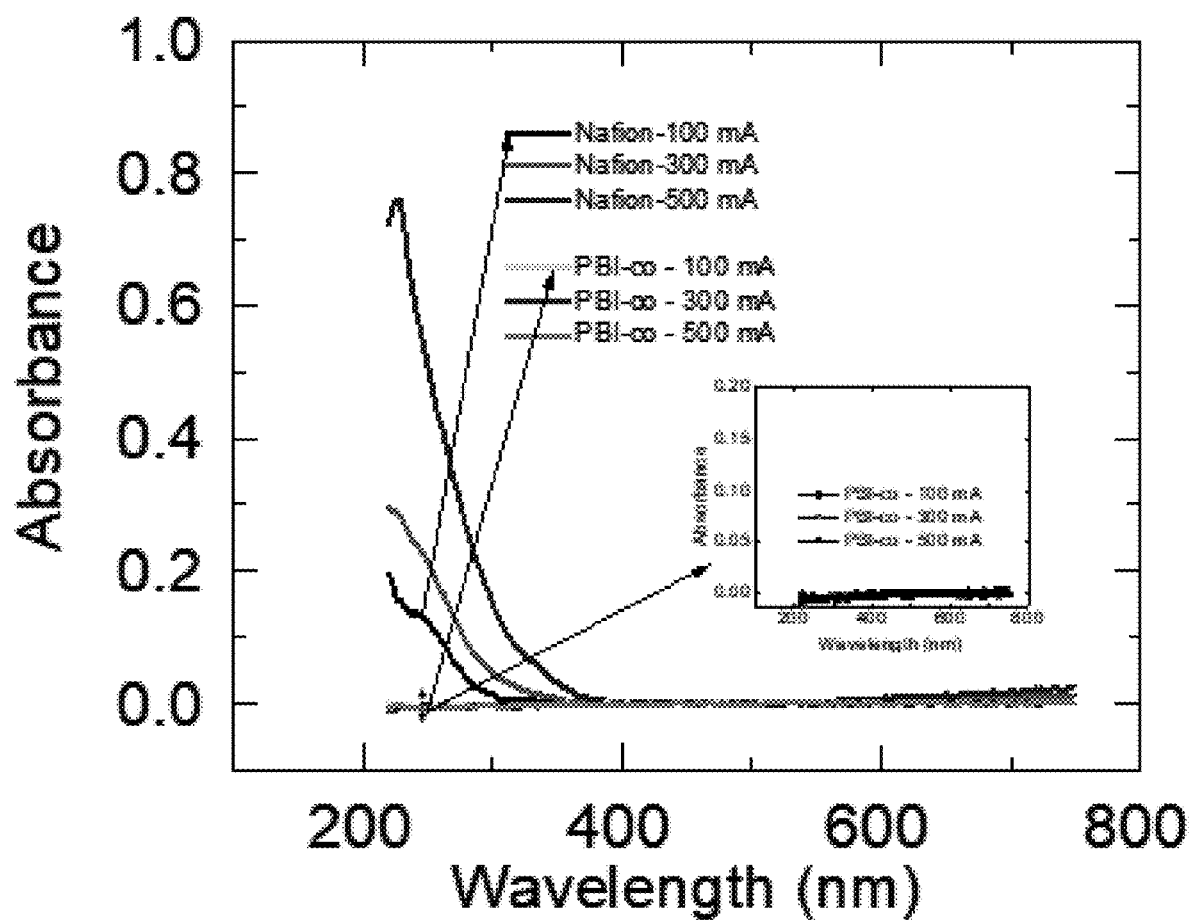
FIG. 8 illustrates UV-vis absorption spectrum from chronopotentiometric experiment (i.e., constant current vs. time), according to some embodiments of the present disclosure.
Figure 9:
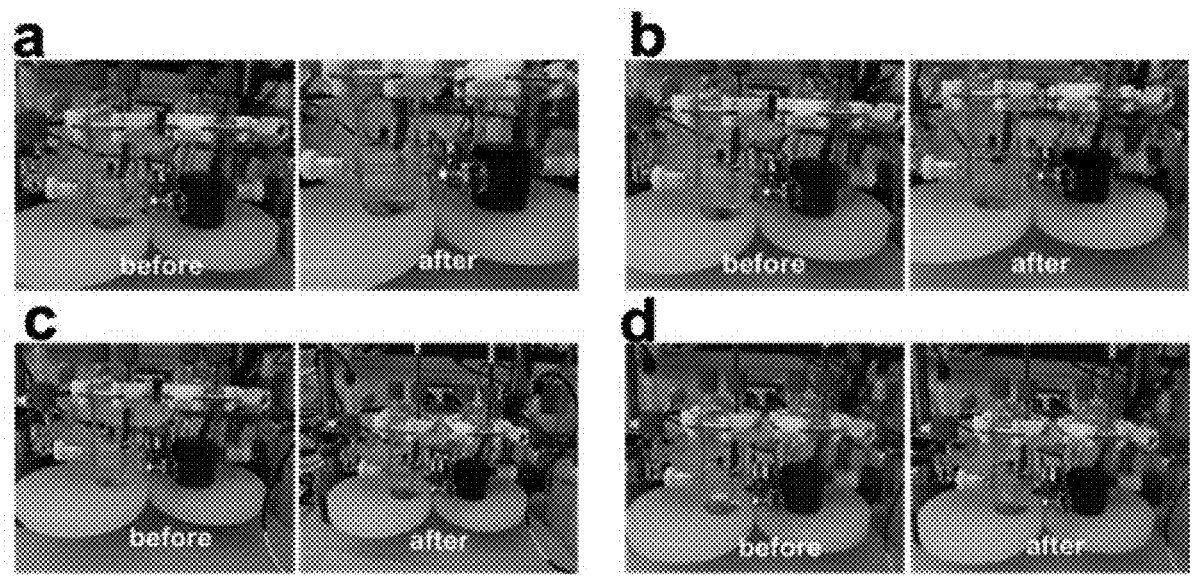
FIG. 9 illustrates photographs of the cells showing vanadium electromigration crossover under applied potential for Nafion® membrane (a) before/after—0.1 V for 1 hour, (b) before/after—0.6 V for 1 hour, (c) before/after—1.0 V for 1 hour, and (d) before/after—1.4 V for 1 hour, according to some embodiments of the present disclosure. The geometric area of the cell in contact with the electrolyte is 1.27 cm$^2$. The vanadium-rich half-cell was filled with 50 mL of 1.0 M $VOSO_4$+2.0 M $H_2SO_4$, and blank half-cell was filled with 50 mL of 1.0 M $MgSO_4$+2.0 M $H_2SO_4$.
Figure 10:
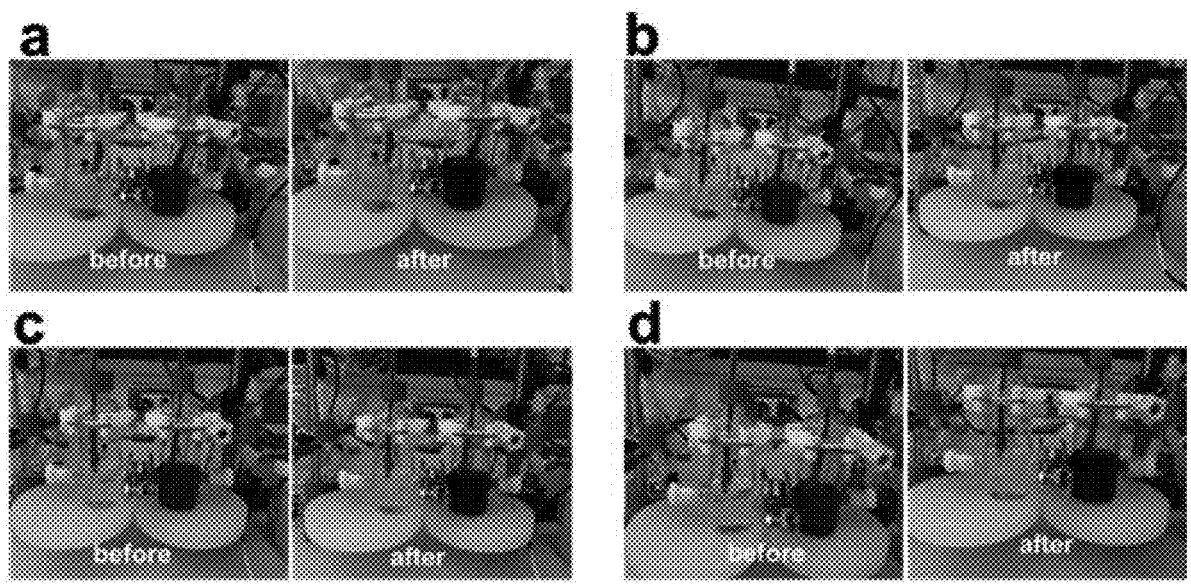
FIG. 10 illustrates photographs of the cells showing vanadium electromigration crossover under applied potential for functionalized PBI-polymer membrane (a) before/after—0.1 V for 1 hour, (b) before/after—0.6 V for 1 hour, (c) before/after—1.0 V for 1 hour, and (d) before/after-1.4 V for 1 hour, according to some embodiments of the present disclosure. The geometric area of the cell in contact with the electrolyte is 1.27 cm$^2$. The vanadium-rich half-cell was filled with 50 mL of 1.0 M $VOSO_4$+2.0 M $H_2SO_4$ and the blank half-cell was filled with 50 mL of 1.0 M $MgSO_4$+2.0 M $H_2SO_4$.
Figure 11:
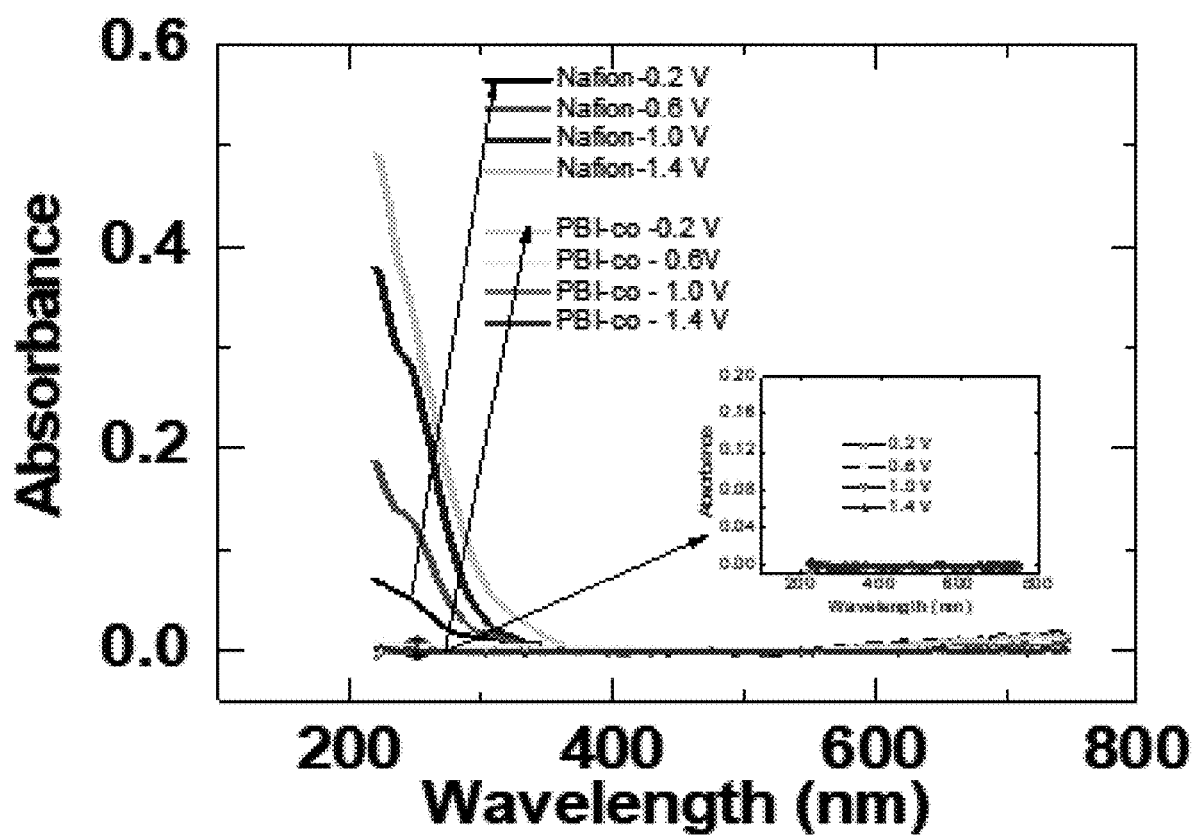
FIG. 11 illustrates a UV-vis absorption spectrum from chronoamperometric experiment (i.e., constant voltage vs. time), according to some embodiments of the present disclosure.
Figure 12:
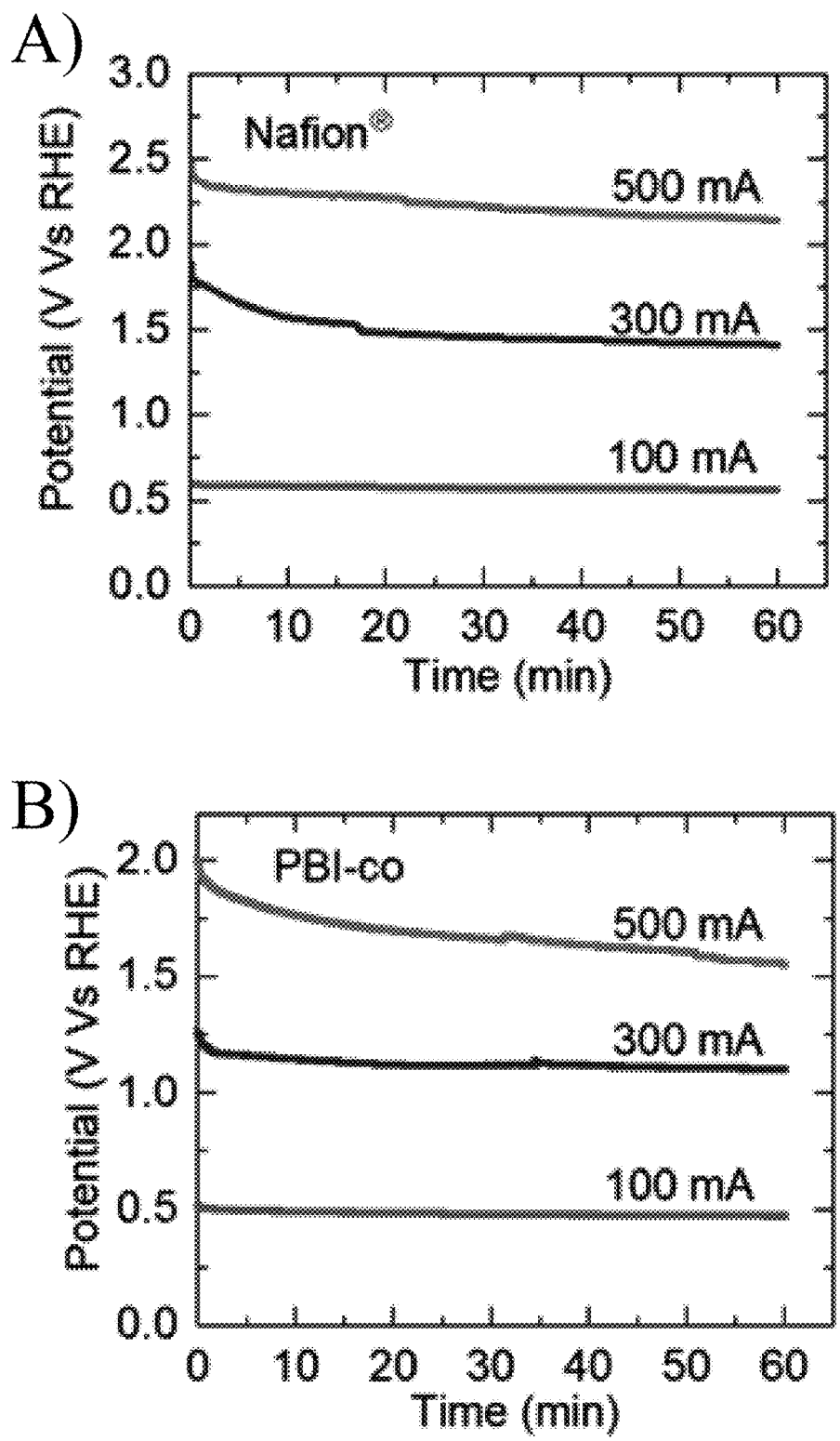
FIG. 12 illustrates chronopotentiometric curves acquired for vanadium ion migration under applied current in a four-point probe electrically driven cell through A) Nafion® membrane and B) functionalized PBI-polymer membrane, according to some embodiments of the present disclosure.
Figure 13:
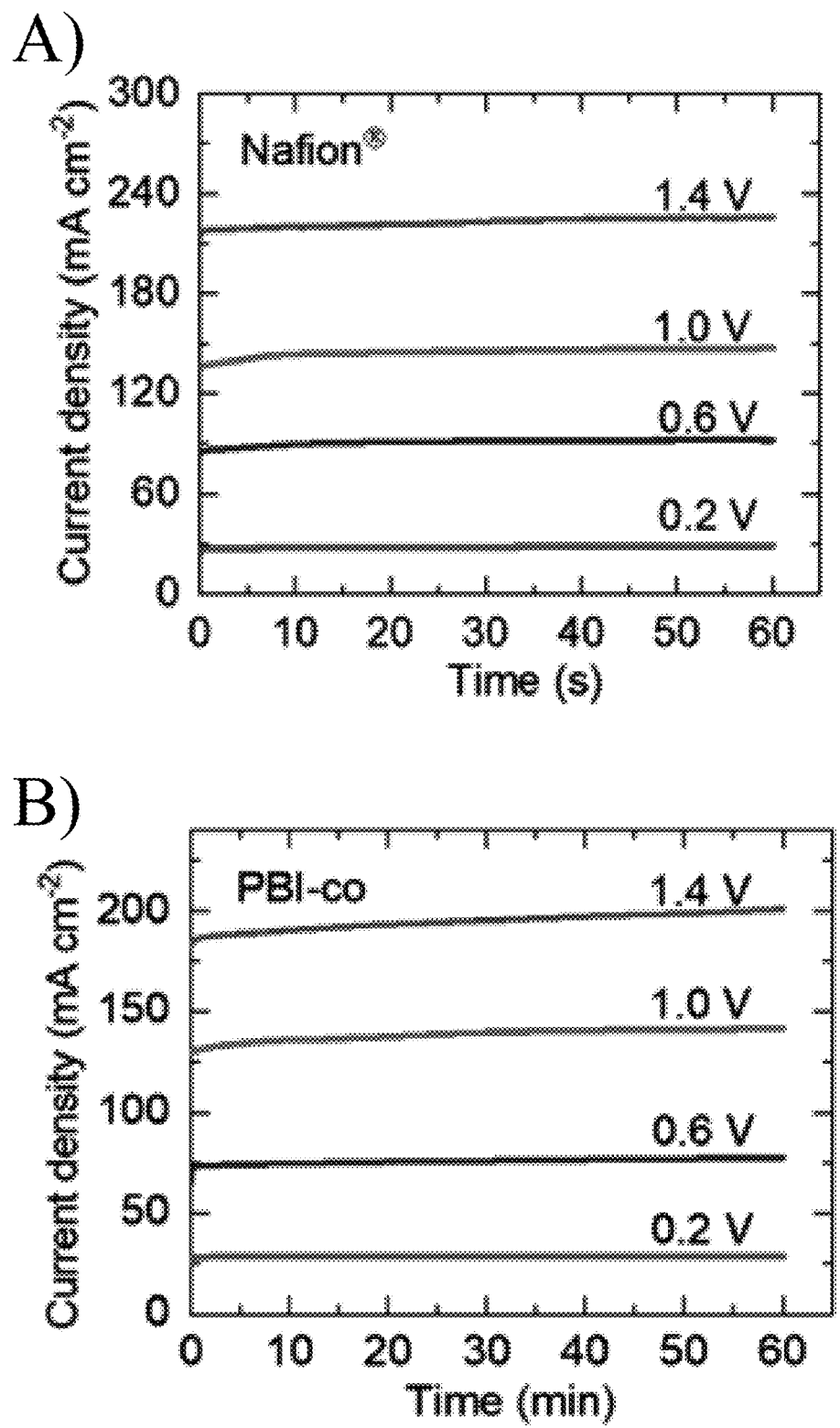
FIG. 13 illustrates chronoamperometric curves acquired for vanadium ion migration under applied potential in four-point probe electrically driven cell through A) Nafion® membrane, and B) functionalized PBI-polymer membrane, according to some embodiments of the present disclosure.

Electromigration Crossover under Applied Current/Potential. To probe ion migration crossover, membrane performances were measured under applied constant current (chronopotentiometric) and applied constant voltage (chronoamperometric) conditions that are relevant to RFB operations. An electrically driven four-point probe cell was used with 1.0 M VOSO$_4$ in 2.0 M H$_2$SO$_4$ in the vanadium-rich cell and 1.0 M MgSO$_4$ in 2.0 M H$_2$SO$_4$ in the blank half-cell. The cell was set up in such a way that the ionic current direction was always from the vanadium-rich half-cell toward the blank half-cell so that vanadium ion permeation across the membrane could be monitored and quantified spectroscopically. Under chronopotentiometric ion migration, 100, 300, and 500 mA were each applied across the cell for separate durations of about 1 hour. Similarly, under chronoamperometric ion migration, 0.2, 0.6, 1.0, and 1.4 V potentials were each applied across the cell for separate durations of about 1 hour. The initial blue color of the vanadium-rich half-cell now appeared darker due to a vanadyl sulfate redox reaction that involves quasi-reversible heterogeneous electron transfer between VO$^{2+}$ (+4 oxidation state) and VO$_2^+$ (+5 oxidation state). In each case, vanadium ion concentration (electromigration driven crossover) in the blank half-cell was analyzed using UV-vis spectrophotometry. FIGS. 6A and 6B presents the results of electromigration crossover studies on functionalized PBI-polymer and Nafion® membranes. The photographs of the cell and UV-vis absorption spectra showing vanadium ion crossover under applied current (see FIGS. 7 and 8 for both Nafion® and functionalized PBI-polymer, respectively), potential (see FIG. 9 for Nafion® and FIG. 10 for functionalized PBI-polymer, their UV-vis absorption spectra FIG. 11), and their respective chronopotentiometric and chronoamperometric curves (see FIGS. 12 and 13).

FIGS. 6A and 6B illustrate time-dependent vanadium ion concentrations (in the blank half-cell) during application of potential and current, respectively. Increasing the applied potential from 0.2 to 1.4 V leads to a noticeable increase in vanadium absorption (see FIG. 11) and hence vanadium ion concentration (see FIG. 6A) for Nafion®, indicating significant electromigration crossover of vanadium ions. In stark contrast, vanadium ion crossover was completely absent for the functionalized PBI polymer membrane at all voltages, with vanadium absorption peaks remaining below the limit of detection. A similar trend was also observed during chronopotentiometric experiment (see FIG. 6B and FIG. 8) when the applied current was increased from 100 to 500 mA. A current-dependent increase in UV-vis absorption peaks (see FIG. 8) and significant vanadium ion flux (see FIG. 6B) were apparent for Nafion©, whereas vanadium ion concentration was again below the limit of detection for functionalized PBI polymer layers. The observed vanadium ion electromigration crossover (under applied current) in the Nafion® membrane is not surprising because even without application of current, Nafion® cannot block ion diffusion crossover. Nafion® ion clusters network with large pore size (1-4 nm) due to its microphase separated structure is a major factor of its unabated crossover. Importantly, FIGS. 4A-4D, 6A, and 6B demonstrate that functionalized PBI polymer membranes effectively block crossover (under both diffusion and ion migration conditions), while still allowing high proton transmission.

Proton Conduction vs. Diffusion vs. Electromigration Crossover. To further probe long term durability and stability for viable RFB applications, a functionalized PBI polymer membrane and Nafion® membrane were each subjected to a sequential series (denoted here as phases 1-5) of rigorous proton conductivity and vanadium crossover mitigation assessments. Quantitative analysis of vanadium ion concentration due to crossover by UV-vis spectrophotometry during this series of experiments is presented in FIGS. 14A and 14B. In the first phase, proton conductivity was evaluated in 1M H$_2$SO$_4$ using the same electrically driven cell for the data in FIGS. 6A and 6B. As expected, proton conductivities in both membranes are identical to the previously obtained values (see Panel a of FIGS. 15 and 16).

In the second phase, the 1.0 M $H_2SO_4$ electrolyte from phase 1 was replaced with vanadium electrolytes to measure vanadium ion crossover rate. In this case, the vanadium-rich half-cell was filled with 1.0 M $VOSO_4$ in 2.0 M $H_2SO_4$, and the blank half-cell was filled with 1.0 M $MgSO_4$ in 2.0 M $H_2SO_4$. Vanadium ion diffusion was observed for a period of 24 h (first diffusion period).

Figure 14A:
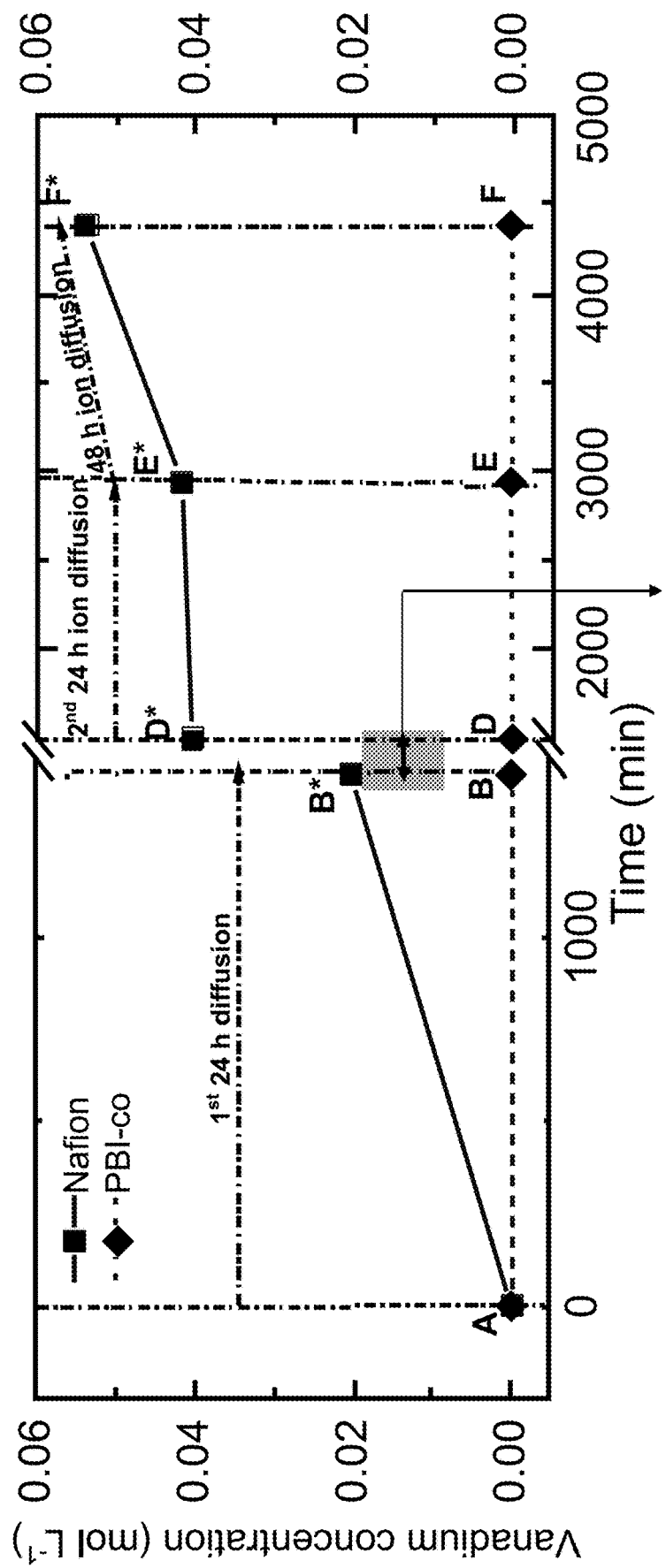
FIG. 14A illustrates an analysis of vanadium ion concentration measured as a function of time in the blank half-cell showing first 24 hours vanadium ion diffusion period prior to ion migration and second 24 hours diffusion period and 48 hours diffusion period following ion migration, according to some embodiments of the present disclosure.
Figure 15:
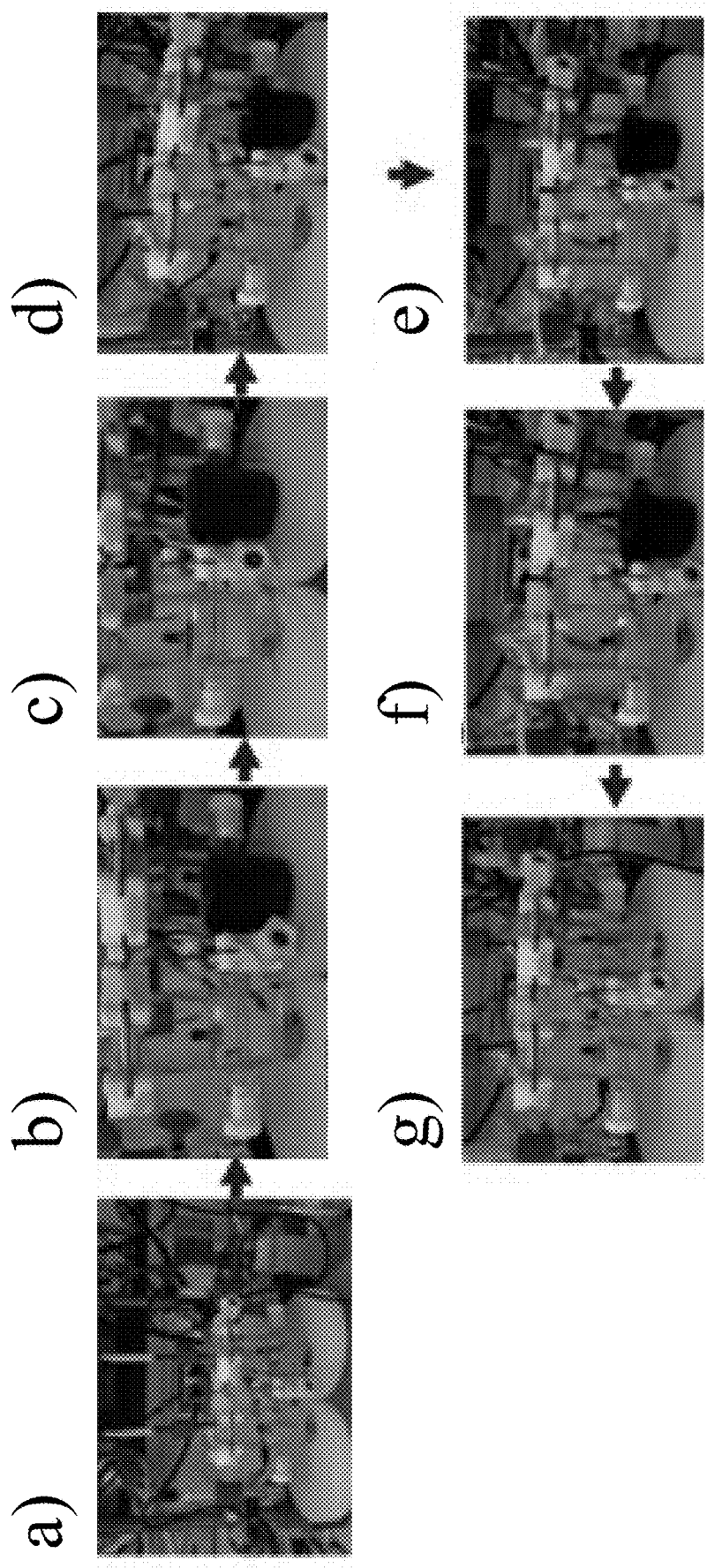
FIG. 15 illustrates photographs of an electrically driven cell containing (a) 1.0 M $H_2SO_4$ during first phase proton conductivity assessment of functionalized PBI-polymer membrane, (b) vanadium electrolytes at the initial second phase for the first vanadium diffusion period, (c) $1^{st}$ 24 hours vanadium diffusion crossover period in the second phase, (d) vanadium electromigration crossover after passing 300 mA for 1 hour in the third phase, (e) $2^{nd}$ 24 hour vanadium diffusion crossover period at the $4^{th}$ phase of assessment following application of current, (f) forty eight hour vanadium diffusion crossover at the $4^{th}$ phase of membrane assessment following application of current, and (g) 1.0 M $H_2SO_4$ during the second proton conductivity assessment in the final $5^{th}$ phase, according to some embodiments of the present disclosure.
Figure 16:
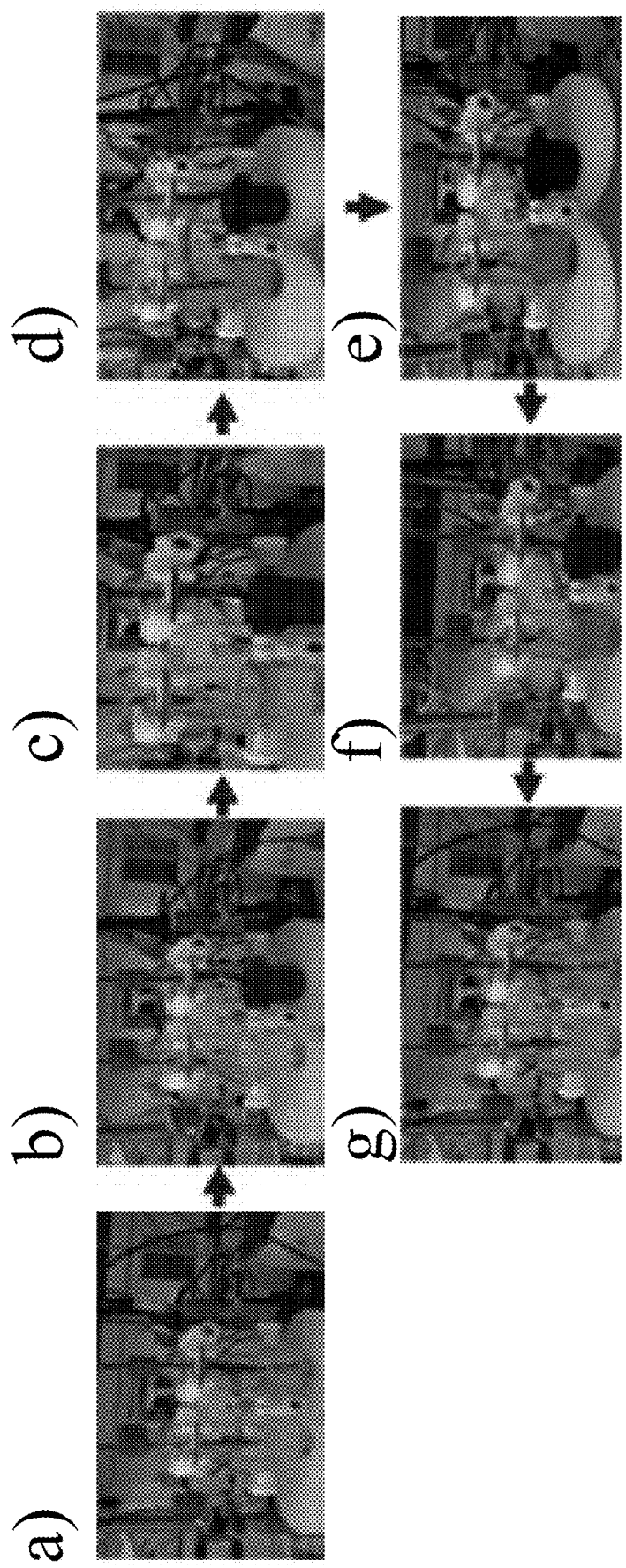
FIG. 16 illustrates photographs of electrically driven cell containing (a) 1.0 M $H_2SO_4$ during first phase proton conductivity assessment of Nafion® membrane, (b) vanadium electrolytes at the initial second phase for the first vanadium diffusion period, (c) $1^{th}$ 24 hour vanadium diffusion crossover period in the second phase, (d) vanadium electromigration crossover after passing 300 mA for 1 hour in the third phase, (e) $2^{nd}$ 24 hour vanadium diffusion crossover period at the $4^{th}$ phase of assessment following application of current, (f) forty eight hour vanadium diffusion crossover at the $4^{th}$ phase of membrane assessment following application of current, and (g) 1.0 M $H_2SO_4$ during the second proton conductivity assessment in the final $5^{th}$ phase, according to some embodiments of the present disclosure.

As shown in the cell photographs in Panels b and c of FIGS. 15 and 16 and FIG. 14A (A→B* for Nafion® and A→B for functionalized PBI-polymer), the blank half-cell for Nafion® shows a noticeable color change—an indication of vanadium ion crossover. However, there was no optically detectable appearance change in the blank half-cell for functionalized PBI polymers, in agreement to previous results.

Figure 14B:
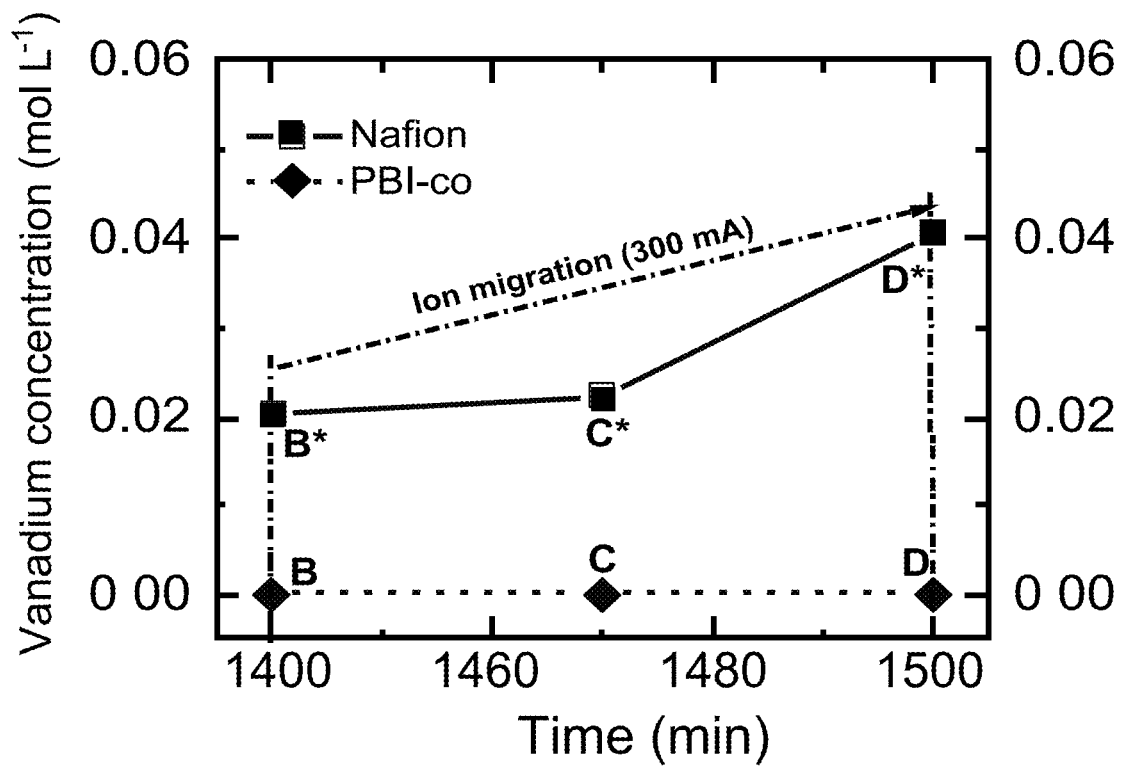
FIG. 14B illustrates vanadium ion crossover subjected to ion migration during the application of 300 mA for 1 hour for both functionalized PBI polymer and Nafion® membranes (the shaded section illustrated in FIG. 14A), according to some embodiments of the present disclosure.

In the third phase, the cells were subjected to a period of electromigration crossover by passing a constant current of about 300 mA for about one hour. An appearance of strong blue color intensity in the blank half-cell suggests appreciable vanadium ion flux through the Nafion® membrane (see Panel d of FIG. 16). In stark contrast, no sign of vanadium ion crossover was observed in the functionalized PBI-polymer membrane following application of 300 mA as shown in FIG. 14B (B*→C*<$1^{st}$ 30 min> and C*→D*<$2^{nd}$ 30 min> for Nafion®, and also B→C→D for functionalized PBI-polymer). See also Panel d of FIG. 15. This finding is consistent with previous results above.

In the fourth phase, following passage of current, the cells were again left for the second vanadium ion diffusion period as shown in FIG. 14A (D*→E*<$2^{nd}$ 24 hour diffusion> and E*→F*<48 hour diffusion> for Nafion®, and D→E→F for functionalized PBI-polymer) (see FIG. 15, Panels e and f, for functionalized PBI polymers and FIG. 16, Panels e and f, for Nafion® cell photographs). Vanadium ion crossover became more pronounced and continued throughout the second diffusion period (up to about 48 hours) for Nafion® membrane, whereas functionalized PBI polymer membranes eliminated vanadium ion crossover with no detectable or apparent color change as evident in Panel f of FIG. 15. Presumably, it is reasonable to posit that during and after application of 300 mA to the cell, and leaving the cell afterward for ~48 hours, the absence of spectroscopically detectable vanadium ion crossover or through visual inspection strongly suggests that functionalized PBI polymer membranes show no measurable changes that may indicate deterioration over the time and conditions of the experiments probed, a key advantage for RFB operation. Finally, in the fifth phase, vanadium electrolytes were again replaced with 1.0 M $H_2SO_4$ to re-evaluate proton conductivity for the second time. Both a functionalized PBI polymer membrane and a Nafion® membrane demonstrated similar proton conductivity as above (see Panel g of both FIGS. 15 and 16).

Figure 17A:
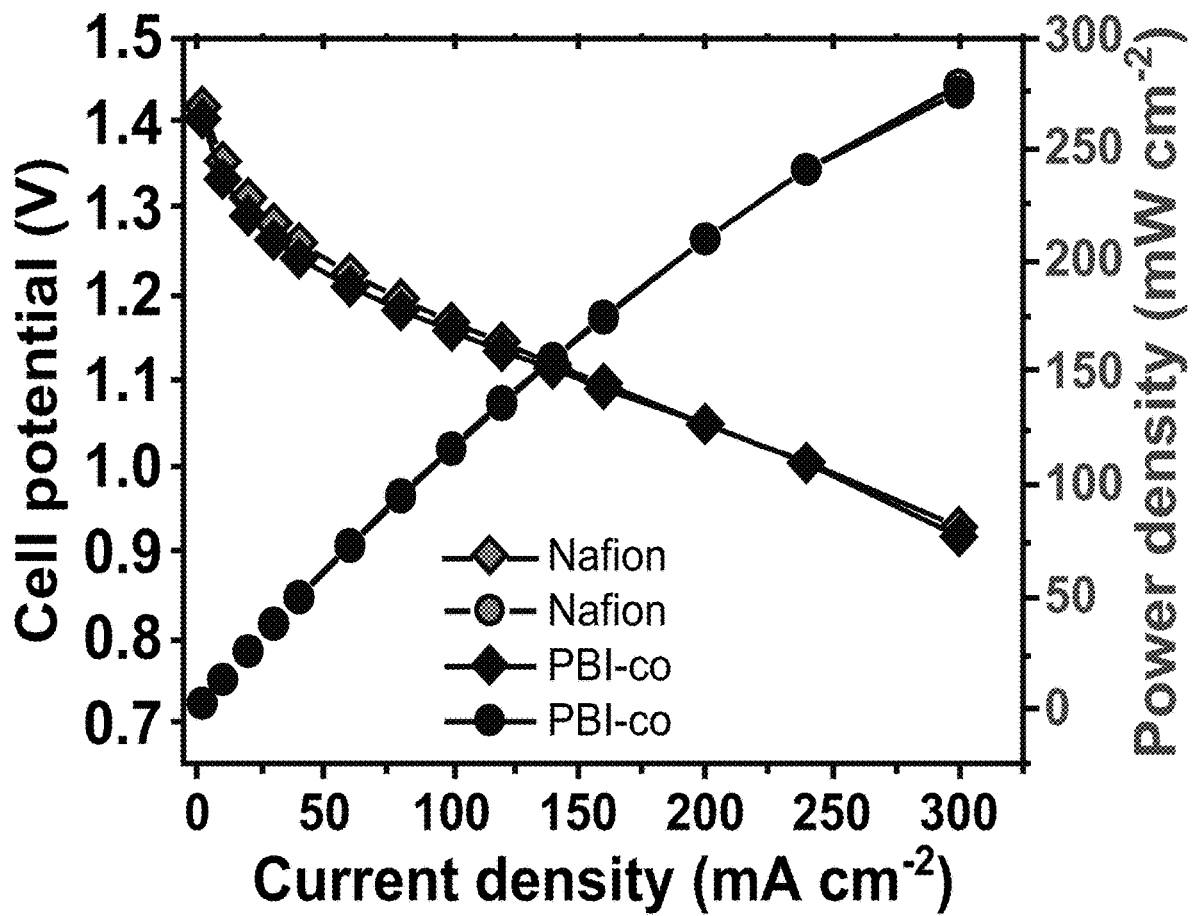
FIG. 17A illustrates discharging polarization curves and associated power density curves for functionalized PBI polymer and Nafion® membranes in a single-cell vanadium-redox flow battery (RFB), according to some embodiments of the present disclosure. The polarization curve is iR corrected using the HFR (high frequency resistance) of the cell. The electrolytes are 1.0 M $VOSO_4$ in 4.0 M $H_2SO_4$ at a flow rate of 16 mL $min^{-1}$.

Vanadium Redox Flow Battery Single-Cell Testing. Polarization curves are normally utilized to analyze losses in most energy conversion and storage devices, including RFBs. These losses are further categorized into activation loss (arising from electrode polarization), ohmic loss, and transport loss (arising from reactant delivery to the electrodes). Ohmic loss is presumably the most relevant to the present work. Among other factors that contribute to ohmic loss, is the resistance to ionic transport, emanating from inherent resistance to through-membrane proton transmission. The membrane's ionic resistance to proton transport can be quantified through determination of area-specific resistance (ASR) and be visualized through polarization curves. FIG. 17A presents discharging polarization curves and the associated power density curves acquired for functionalized PBI polymer layers and Nafion® layers in single-cell vanadium-RFB. The electrolytes, 1.0 M $VOSO_4$+4.0 M $H_2SO_4$, circulated to the cell at a flow rate of 16 mL $min^{-1}$, at 30° C.

Prior to each polarization curve, the high frequency resistance (HFR) was measured using AC impedance for vanadium-RFB with functionalized PBI polymer and Nafion® membranes. The measured HFR for Nafion® was 0.0731Ω, and 0.0697Ω for functionalized PBI polymers. Normalization by the cell geometric area (5 $cm^2$) gives an area-specific resistance (ASR). The ohmic ASR for both membranes were essentially identical, with ca. 0.37 $\Omega cm^2$ for Nafion® (50 µm) and ca. 0.35 $\Omega cm^2$ for functionalized PBI polymers (40 µm). These equivalent ohmic ASR values translate into similar discharging polarization curves and power density curves (see FIG. 17A). Both cells exhibited identical mass-transport limited current density of ~300 mA $cm^{-2}$. The ability for functionalized PBI polymer membranes to match the proton conductivity of Nafion® is remarkable, since Nafion® membranes typically out-perform other membranes.

Figure 17B:
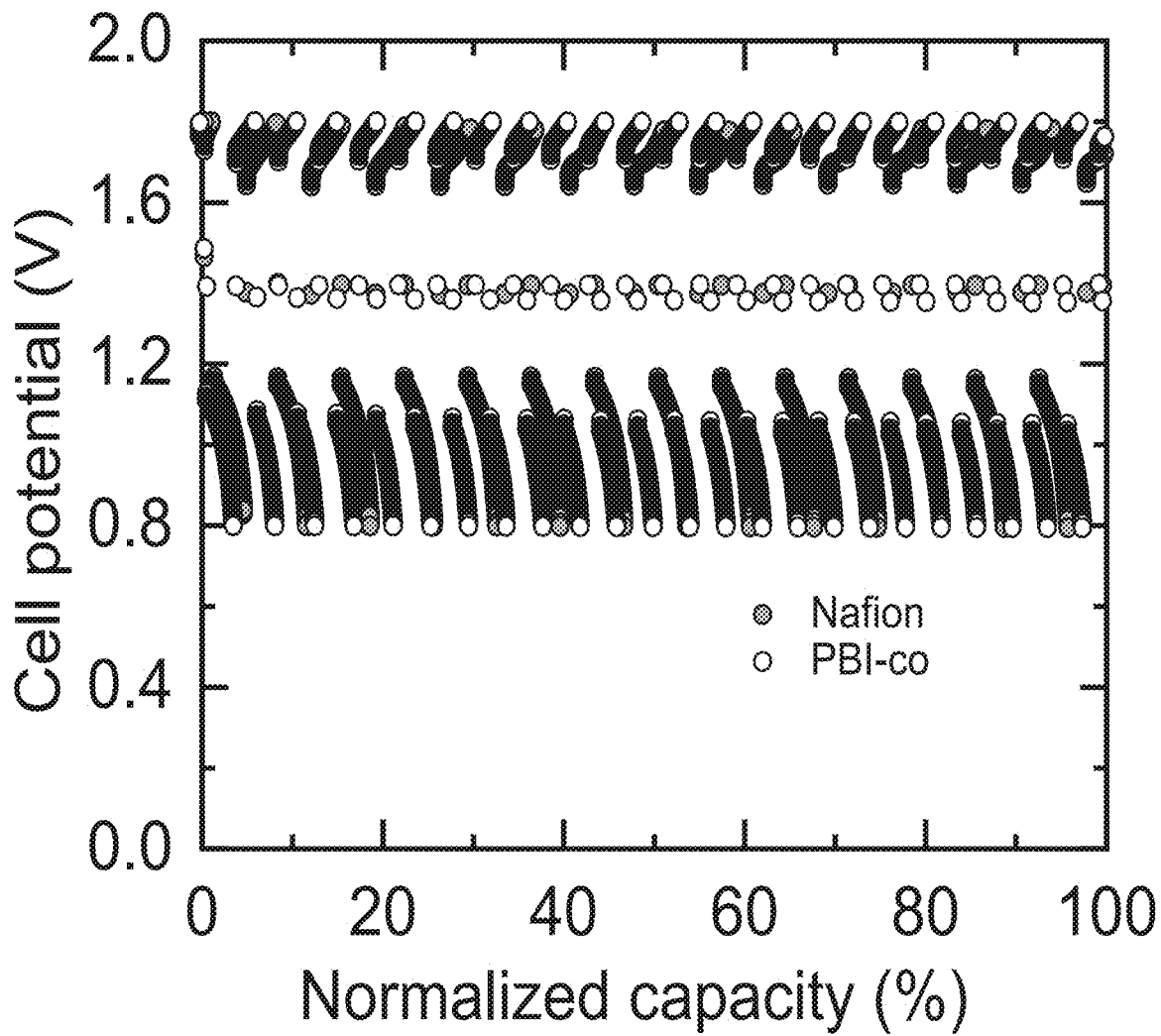
FIG. 17B illustrates the charge-discharge cycles of a vanadium-RFB at 100 mA $cm^{-2}$, according to some embodiments of the present disclosure.
Figure 18:
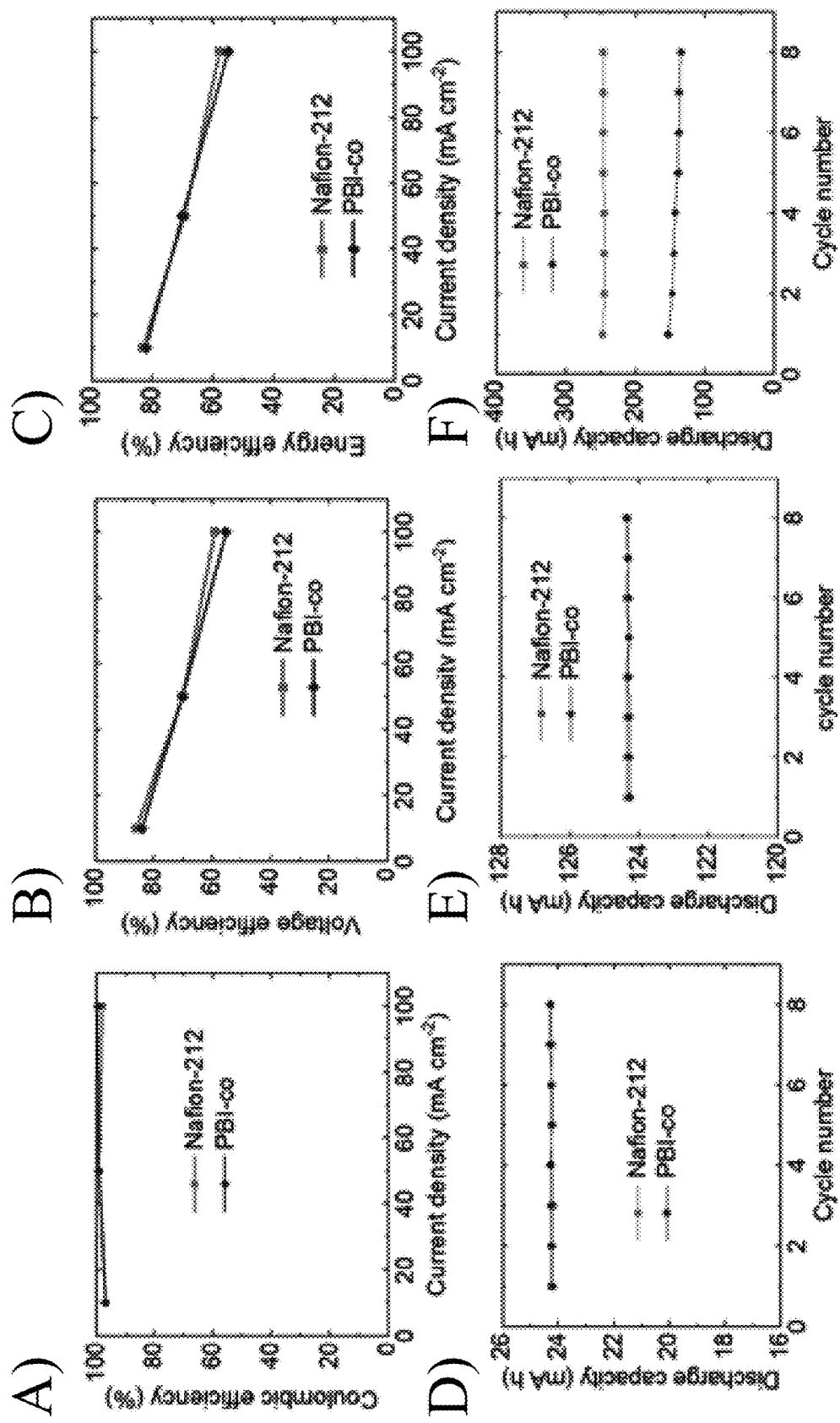
FIG. 18 illustrates coulombic efficiency A), voltage efficiency B), energy efficiency C) of single-cell vanadium-RFB with acid-functionalized PBI-polymer and Nafion-212 membranes, according to some embodiments of the present disclosure; discharge capacity against cycle number of vanadium-RFB with acid functionalized PBI-polymer and Nafion-212 membrane D) 10 mA $cm^{-2}$, E) 50 mA $cm^{-2}$, and F) 100 mA $cm^{-2}$.

FIG. 17B illustrates representative charge-discharge cycles of vanadium-RFB utilizing both functionalized PBI polymer layers and Nafion® layers at 100 mA $cm^{-2}$, and at a C-rate of C/15 (the time in hours it would take the battery to be completely discharged/charged). The two-step charging protocol was set at 50% state of charge (SOC). The center curve at ~1.4 V is the open cell potential measured after every complete charge-discharge cycle. The charge-discharge voltage was essentially similar in both membranes in agreement to previous results. The coulombic efficiencies (CE) and voltage efficiencies at 50 mA $cm^{-2}$ were 99.2% and 70% for functionalized PBI polymers, and 99% and 70% for Nafion®, respectively. And at 100 mA $cm^{-2}$, these values were 99.5% and 55.2% for functionalized PBI polymers, whereas Nafion® values were 98% and 59%. Thus, the voltage efficiency at 50 mA $cm^{-2}$ was the same for both membranes, albeit Nafion® has slightly higher VE at 100 mA $cm^{-2}$. However, functionalized PBI polymer layers show slightly higher coulombic efficiency at both 50 mA $cm^{-2}$ and 100 mA $cm^{-2}$ than Nafion® membranes, which may result from vanadium crossover in the Nafion® membrane, which is absent in the functionalized PBI polymer membranes. Further details are provided in FIG. 18 for the CE, VE, and EE at the current densities studied, including the discharge capacity for both acid-functionalized PBI layers and Nafion® layers.

Figure 19:
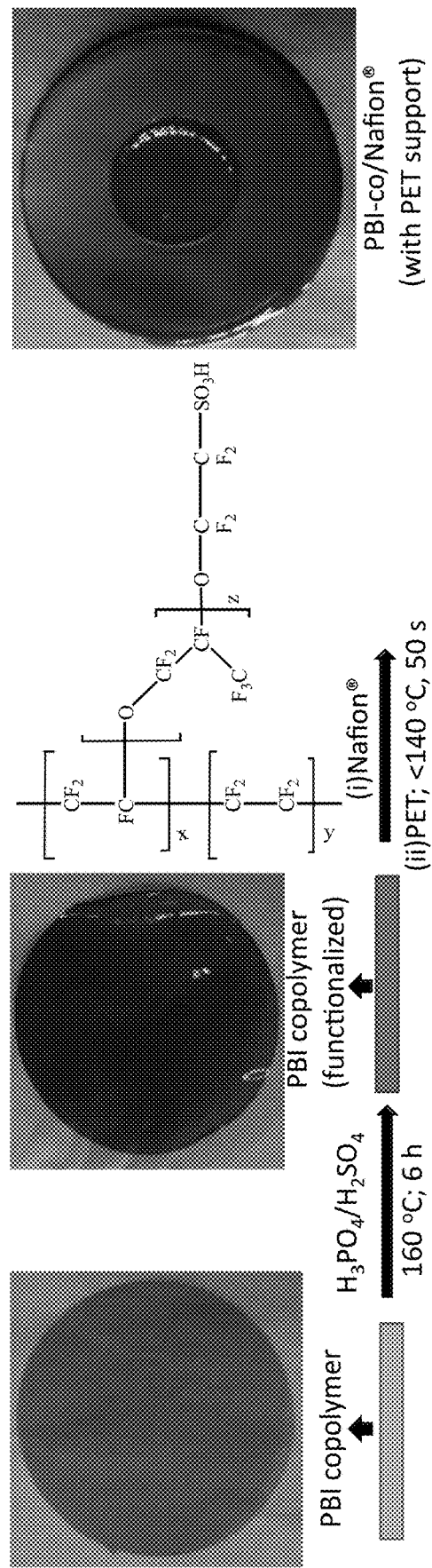
FIG. 19 illustrates photographs of the composite PBI-polymer/Nafion® composite membranes resulting from the schematic manufacturing route also illustrated, according to some embodiments of the present disclosure.
Figure 20:
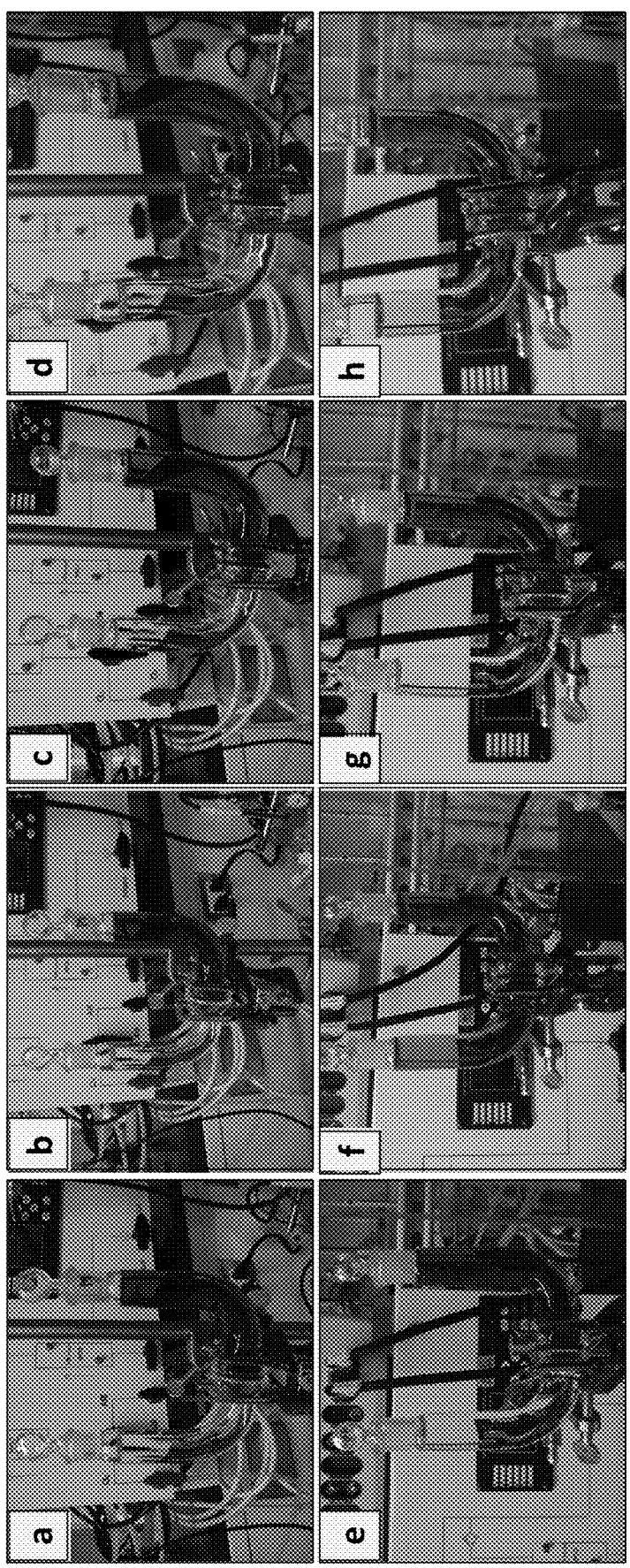
FIG. 20 illustrates permeability studies in a diffusion cell of vanadium and iron crossover of PBI-polymer/Nafion: (a) vanadium crossover-initial day, (b) vanadium crossver-after 30 days, (c) iron crossover: initial day, (d) iron crossover-after 30 days. Vanadium and iron crossover of Nafion, (e) Vanadium crossover-initial day, (f) vanadium crossver-after 30 days, (g) iron crossover: initial day, (h) iron crossover-after 30 days, according to some embodiments of the present disclosure.

PBI polymer/Nafion® composite. A polybenzimidazole polymer was effectively functionalized with a mixture of concentrated sulfuric and phosphoric acids at a temperature of about 160° C. Following acid functionalization, a thin layer of perfluorosulfonic acid ionomer membrane (Nafion®-25 m thickness) was positioned adjacent to the acid functionalized PBI polymer to form a membrane film composite. A pre-cut polyethylene terephthalate (PET) with appropriately sized hole was then added to ensure a known geometric area of the membrane film composite. This was then exposed to the electrolytes during cell testing. (See FIG. 19). The PBI polymer/Nafion composite film demonstrated the ability to mitigate ion species crossover, while maintaining proton conductivity. On the other hand, a standard Nafion membrane demonstrated a significant amount of crossover as shown in FIG. 20.

Materials and Methods:

Materials. Polybenizimidazole polymer (Fumapem-AM-40-PBI polymer) and Nafion®-212 (50 µm) were purchased from the Fuel Cell Store. Vanadium (IV) oxide sulfate hydrate; $VOSO_4.xH_2O$ (Sigma Aldrich) was dehydrated before use under vacuum at 105° C. for up to five days. Magnesium sulfate ($MgSO_4$) and phosphoric acid (85 wt. % in $H_2O$) were purchased from Sigma Aldrich. Sulfuric acid ($H_2SO_4$, 98%) was obtained from GFS Chemicals. An experimental diffusion cell was fabricated by Precision Glassblowing Inc. An experimental electrically driven four-point probe cell was fabricated by Adams and Chittenden Scientific Glass (Model No: 946991). Silicone rubber foam sheet (part No: 31938749, ~0.635 cm thickness) was purchased from MSC Industrial Direct Co., Inc. Polyethylene terephthalate (PET, 75 μm) was obtained from Goodfellow Corporation. Milli-Q $H_2O$ (18.2 MΩ cm resistivity) was used for all experiments.

Polybenzimidazole Polymer (PBI-polymer) Post-Functionalization. A PBI-polymer membrane sheet was cut into several disks of ~3.0 cm diameter using a punch. The membranes were transferred into a glass container filled with 100 mL of concentrated $H_3PO_4$ and then placed in an oven set at 160° C. for about 6 to 8 hours. The membrane samples were left submerged in acid until when they were ready to be tested. The above procedure was also followed with PBI-polymer membrane functionalization with concentrated $H_2SO_4$. For the mixture of concentrated $H_3PO_4$ and $H_2SO_4$, first, 100 mL of concentrated $H_3PO_4$ was poured into a glass container followed by a slow addition of 100 mL of concentrated $H_2SO_4$. Thereafter, membrane samples were transferred to an oven set at 160° C. for about 8 hours. The rest of the procedures were the same as above. Prior to use, the membrane samples were washed with Milli-Q water copiously and blotted with Kimwipes.

Figure 21:
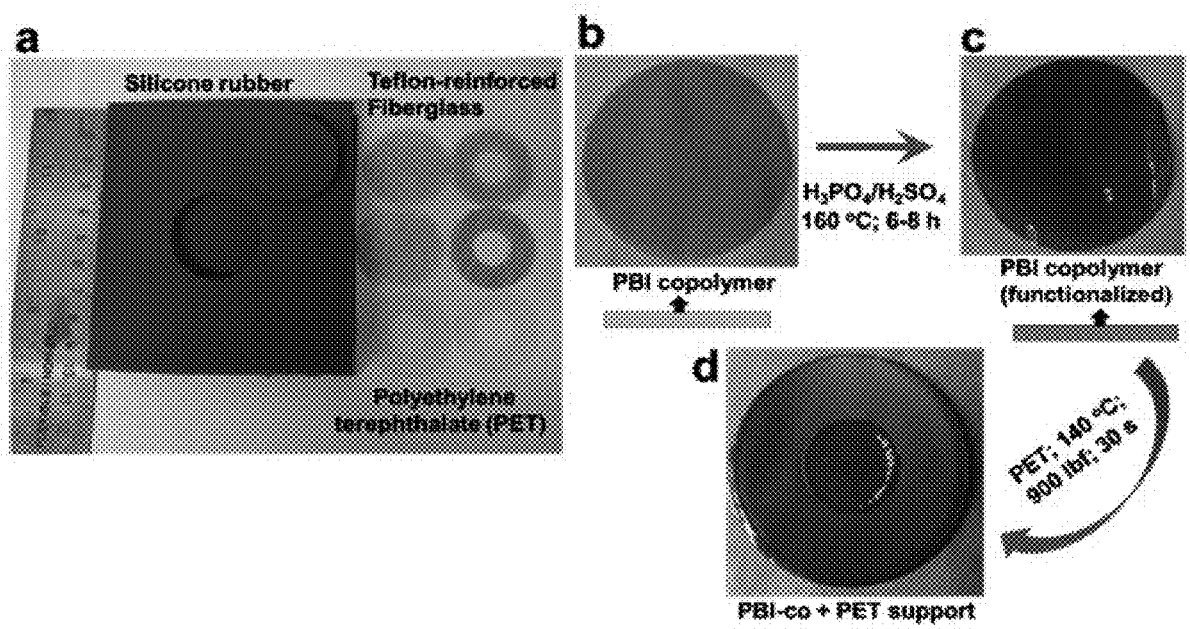
FIG. 21 illustrates sample fabrication protocol, according to some embodiments of the present disclosure: (a) silicone rubber foam sheet with Teflon-reinforced fiberglass and polyethylene terephthalate (PET) template for sample assembly, (b) unfunctionalized polybenzimidazole polymer membrane, (d) functionalized polybenzimidazole polymer membrane, and (d) final sample fabrication with PET supports. PET was added to provide firm support to the membrane, prevent liquid electrolyte leakage, and to prevent contribution to ion transmission from outside the geometric area of the membrane that was in contact with the electrolyte.
Figure 22:
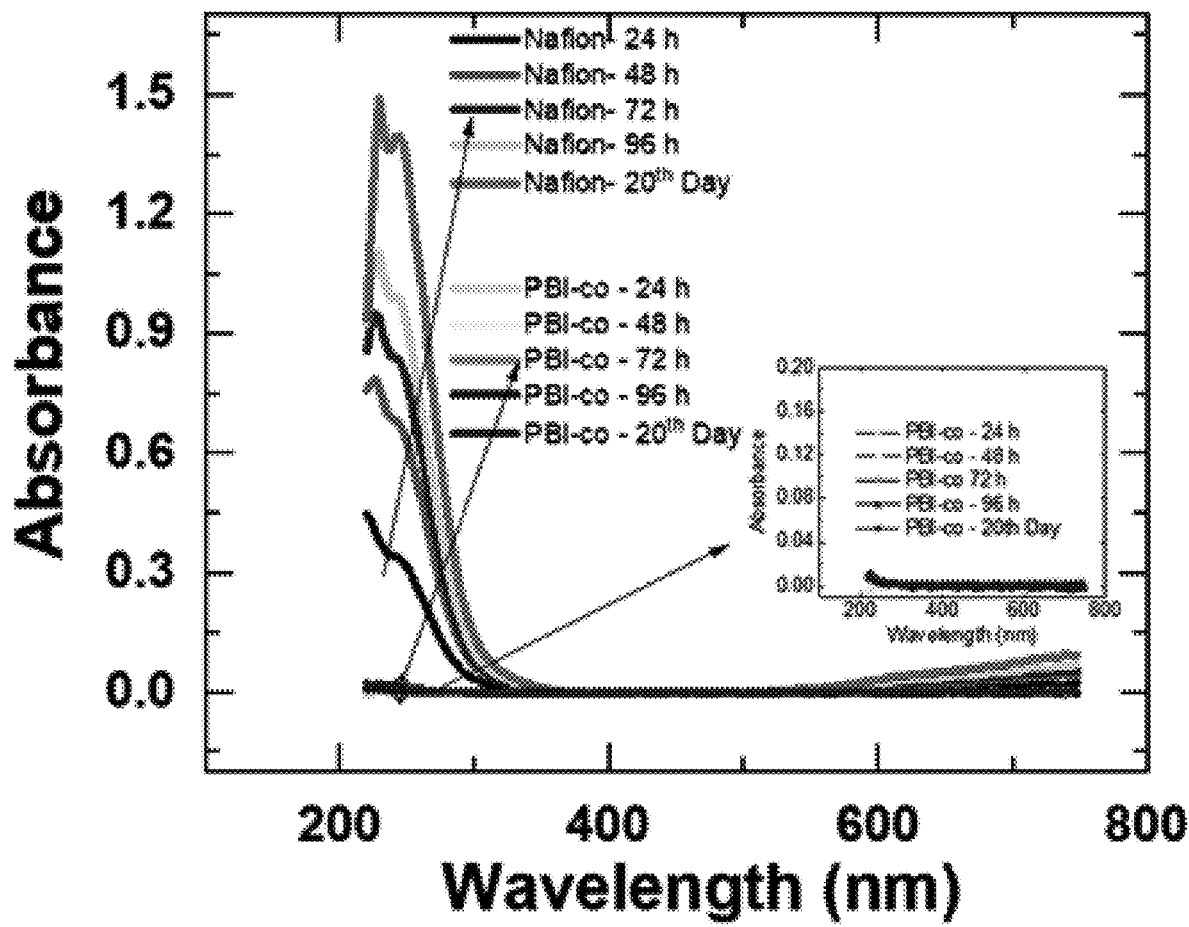
FIG. 22 illustrates UV-vis spectrum of vanadium ion diffusion through Nafion® and functionalized PBI-polymer, according to some embodiments of the present disclosure.

Polybenzimidazole Polymer and Nafion® Membrane (with PET Supports) Fabrication. All samples were fabricated in a silicone rubber foam sheet template and Teflon-reinforced fiberglass (see FIG. 21). In brief, a ~3.0 cm diameter hole was cut out of silicone rubber to hold the sample during the hot press step. Two sets of fiberglass sheet were cut (~3.0 cm diameter) with one set having a 1.27 cm diameter hole at the center. PET supports were cut into ~3.0 cm diameter also having a 1.27 cm diameter hole at the center. The first fiberglass sheet (with no hole) was placed inside the silicone rubber. The second fiberglass sheet (with a hole) was then added. Then the first disk of PET support was placed on top followed by addition of functionalized PBI-polymer. A second PET support disk was then placed on the membrane and then fiberglass sheet (with and without hole) were finally placed atop. The whole assembly was then covered with the silicone rubber and hot pressed at 140° C., 900 lbf, and for about 40 seconds. The above procedures were also followed for Nafion® samples fabrication. We used PET to provide firm support to the membrane, prevent liquid electrolyte leakage, and to prevent contribution to ion transmission from outside the geometric area of the membrane that was in contact with the electrolyte.

Fourier-Transform Infrared Spectroscopy (FTIR) and UV-vis Characterization. FTIR measurements were conducted on all functionalized and unfunctionalized PBI-polymer membrane samples using a Nicolet 6700 ThermoFiser Scientific spectrophotometer. The spectra were acquired within a wavenumber range from 4000 to 500 $cm^{-1}$, with a resolution of 4.0 $cm^{-1}$, with data averaged over 32 scans. During measurements, attenuated total reflection (ATR) mode was employed to acquire the FTIR spectra of PBI-polymer membrane samples. Vanadium concentration was analyzed using ThermoFisher Scientiifc™ NanoDrop™ 8000 microvolume UV-vis spectrophotometer. The molar attenuation coefficient (e) was 204.6 L $mol^{-1}$ $cm^{-1}$, and the measurements were taken at λmax (ε)=245 nm. UV-vis data were further analyzed to estimate permeability using Fick's first law as described elsewhere.

Ion-Exchange Capacity (IEC) and Water Uptake Measurements. Following acid functionalization of PBI-polymer membrane, the membrane samples were washed with Milli-Q $H_2O$ copiously and dried at ambient temperature. Thereafter, the membrane samples were equilibrated in 1.0 M $H_2SO_4$ for about 24 hours. Further, membrane samples were blotted with Kimwipes and dried at 40° C. under vacuum for about 24 hours. The weight of the dried membrane was recorded. Then membrane samples were immersed in 50 mL of 2.0 M NaCl for at least 24 hours for ion-exchange. The solution was then titrated to determine ion-exchange capacity with 0.1 M NaOH aqueous titrant using a Mettler Toledo titrator T90. For water uptake, following acid functionalization, the membrane samples were washed with Milli-Q $H_2O$ several times. The membrane samples were then dried at 40° C. under vacuum for 24 hours. The membrane weight ($W_{dry}$) was then determined. The membrane samples were then immersed in $H_2O$ for at least 3 days. Finally, the hydrated membrane samples were blotted, and weighed ($W_{hyd}$). Ion-exchange capacity (IEC) is estimated using Eq. (2):

$$IEC(meq\ g^{-1}) = (0.1 M NaOH \times V_{NaOH})/W \quad \text{Eq.(2)}$$

where $V_{NaOH}$=the volume of NaOH (L) consumed during titration with the released proton concentration during ion-exchange, and W=weight of the sample (g). Water uptake ($\varphi(\%)$) can be obtained from Eq. (3):

$$\varphi(\%) = ((W_{hyd} - W_{dry})/W_{dry}) \times 100 \quad \text{Eq.(3)}$$

where $W_{hyd}$=weight of the hydrated membrane (g), and $W_{dry}$=weight of the dry membrane (g). Hydration number (λ) is calculated from Eq. (4):

$$\lambda = \left(\frac{W_{hyd} - W_{dry}}{W_{dry}}\right)\left(\frac{1000}{IEC \times Mw H_2O}\right) \quad \text{Eq. (4)}$$

where, $M_w$ $H_2O$=molecular weight of water (g $mol^{-1}$).

Membrane Swelling and Dimensional Change. The samples were briefly dried at 60° C. under vacuum oven for 3 hours. The samples were then immersed in 1.0 M $H_2SO_4$ for 24 hours. The swelling ratio in thickness ($S_T$) and length ($S_L$), including dimensional change ($D_C$) for acid-functionalized PBI-polymer membrane and Nafion® were calculated using Eq. (5-7).

$$S_T = \frac{T_{wet} - T_{dry}}{T_{dry}} \times 100 \quad \text{Eq. (5)}$$

$T_{wet}$=thickness of wet membrane (cm) and $T_{dry}$=thickness of dry membrane (c)

$$S_L = \frac{L_{wet} - L_{dry}}{L_{dry}} \times 100 \quad \text{Eq. (6)}$$

$L_{wet}$=length of wet membrane (cm) and $L_{dry}$=length of dry membrane (cm)

$$D_C = \frac{A_{wet} - A_{dry}}{A_{dry}} \times 100 \quad \text{Eq. (7)}$$

$A_{wet}$=area of wet membrane (cm$^2$) and $A_{dry}$=area of dry membrane (cm$^2$)

Membrane Conductivity Measurement using AC Impedance Method. Membrane conductivity in the in-plane direction was determined using a four-electrode cell by electrochemical impedance spectroscopy. The functionalized PBI-polymer membrane sample was washed with Milli-Q H$_2$O, and afterward, equilibrated in 1.0 M H$_2$SO$_4$ for 24 hours. After removing all the liquid droplets from the membrane using Kimwipes, the membrane was mounted onto the conductivity cell. The measurement was conducted on a Solartron CellTest® system consisted of 1470E multi-channel potentiostat equipped with 1451 frequency response analyzer (FRA) in the frequency range between 1 Hz and 100 kHz at 30° C., from 95 to 20% relative humidity (RH). The electrical resistance of the membrane between the two inner sense electrodes (platinum wire) was determined at the high frequence intercept of the complex plane (Nyquist plot) to the real impedance axis. From the measured membrane resistance, the length between the two sense electrodes (0.64 cm), the membrane width (0.5 cm), and the membrane thickness (measured using a micrometer), the conductivity was estimated using Eq. (8).

$$\sigma_H = \frac{L}{R \times W \times \delta} \qquad \text{Eq. (8)}$$

$\sigma_{//}$=in-plane membrane conductivity (s cm$^{-1}$), L=distance between the two sense electrodes (cm), R=measured membrane resistance ($\Omega$), W=width of the membrane (cm), and $\delta$=membrane thickness (cm).

Vanadium Permeability Measurement in Diffusion Cell. Vanadium crossover due to concentration graident was measured in a diffusion cell that consists of two half-cells, butyl rubber O-rings, membrane, and mesh screen (to prevent membrane deflection). One side of the half-cell was filled with 18 mL of (1.0 M VOSO4+2.0 M H$_2$SO$_4$) as served as the vanadium-rich reservoir. The other side of the half-cell was filled with 18 mL of (1.0 M MgSO$_4$+2.0 M H$_2$SO$_4$). Using a pinch clamp (Chemglass, part no: CG-150-05), the test membrane was placed at the center resting on a mesh screen and was clamped in-between the two half-cells. The geometric area of the membrane exposed to the electrolyte was ca. 1.27 cm$^2$. Vanadium ion flux due to ion diffusion was monitored for both functionalized PBI-polymer and Nafion® membrane for over twenty days. Vanadium ion concentration in each half-cell was quantified using Nanodrop UV-vis spectrophotometry.

Conductivity Measurements using Direct Current (DC) Method. Through-plane proton and vanadium ion transport through the membranes were measured in a four-point probe electrically driven cell. Two Nafion®-211 sheet equivalent to 50 μm nominal thickness were hot pressed together and used for DC conductivity measurements. To equilibrate the membranes in VO$^{2+}$, the membrane samples were immersed in 1.0 M VOSO$_4$ for at least 3 days. The electrically driven cell consisted of two half-cells filled with the same electrolyte i.e., 1.0 M H$_2$SO$_4$ and 1.0 M VOSO$_4$. Each of the half-cell was filled with 50 mL of the respective electrolyte. The geometric area of the membrane in contact with the electrolyte was ca. 1.27 cm$^2$. Two electrodes served as working electrodes that drove ionic current through the membrane. The other two electrodes served as sense electrodes (reference electrodes) that measured the transmembrane potential difference that developed. The reference electrodes were Hg—Hg$_2$SO$_4$ electrodes saturated with K$_2$SO$_4$. The reference electrodes were installed in Luggin capillaries in each of the half-cell that were in close proximity to the membrane in order to minimize ohmic loss. The two drive electrodes consisted of Pt mesh electrodes one serving as a working electrode and the other as a counter electrode. All of the electrodes leads from the cell were connected to Autolab PGSTAT302N potentiostat workstation. Measurements were conducted in potentiostatic mode. Upon application of small potential bias±100 mV, using a slow scan linear sweep voltammetry at a scan rate of 10 mV s$^{-1}$, current-potential (I-V) curves were acquired for proton and vanadium ion transmission through membrane. Through-membrane ion transmission resistance was estimated from the slope of the I-V curve which in turn gave ion conductivity, considering membrane thickness and geometric area of the membrane. Through-plane membrane conductivity in aqueous electrolyte can be calculated using Eq. (9).

$$\sigma_\perp = \frac{l}{R \times A} \qquad \text{Eq. (9)}$$

where, $\sigma_\perp$=through-plane membrane conductivity (S cm$^{-1}$), l=membrane thickness (cm), R=measured membrane resistance—electrolyte resistance ($\Omega$), and A=area of the membrane in contact with the electrolyte (cm$^2$)

Electromigration Crossover under Applied Current/Potential Measurement. Vanadium ion crossover under applied current/potential (electromigration crossover) was studied in the four-point probe electrically driven cell described above. The vanadium-rich half-cell was filled with 50 mL of 1.0 M VOSO$_4$+2.0 M H$_2$SO$_4$, while the blank half-cell was filled with 50 mL of 1.0 M MgSO$_4$+2.0 M H$_2$SO$_4$. The reference electrodes (Hg—Hg$_2$SO$_4$) were installed in Luggin capillaries in each compartment of the half-cell. The working electrodes (Pt mesh) drive ionic current through the membrane from vanadium-rich half-cell to the blank half-cell so that vanadium ion crossover can be monitored and quantified as a function of current and time. Constant current holds from 100 mA to 500 mA and constant voltage holds from 0.2 V to 1.4 V were applied to the cell for a duration 1 h for each applied current or potential during which vanadium crossover was monitored. Vanadium ion concentration was quantified using Nanodrop UV-vis spectrophotometry.

Vanadium Redox Flow Battery Testing: (a) Cell assembly: A single cell with area 5 cm$^2$ was adopted in this work. Carbon paper (SGL 39AA, thickness 280 μm) was used as the electrode in both anode and cathode. The PTFE-coated gaskets with 75% thickness of carbon paper ensured enough compression to seal the cell. Nafion®-212 (50 μm) and functionalized PBI-polymer (40 μm) were used as separators. The cell was assembled in zero-gap structure following previously reported design. Total vanadium ions being 1.0 M and 4.0 M sulfuric acid were prepared as electrolyte solution. A peristaltic pump was adopted to control circulation of the electrolyte to the cell at a flow rate of 16 mL min$^{-1}$. (b) Battery testing: SP-150 (EC-lab, Biologic) was used to perform cell testing. Battery charging/discharging was conducted following previously reported protocol. Initially, we set the SOC of 50% with a two-step charging protocol, which ensured the ratio of V$^{2+}$/V$^{3+}$ was unity. Open Circuit Voltage (OCV) was then used to measure the initial voltage. A single-cell vanadium-RFB was initially charged to 1.8 V (as the upper cut-off voltage) and discharged to 0.8 V (as the lower cut-off voltage) at 10, 50, and 100 mA cm$^{-2}$, and then cycled at the current densities for 8 cycles. Potentiostatic Electrochemical Impedance Spectroscopy (PEIS) was adopted to measure the internal resistance of the cell and to monitor cycling steps. Chronopotentiometry (CP) was adopted for cell performance evaluation by current steps. The recorded current-potential (I-V) plots for both membranes correspond to the polarization curve.

EXAMPLES

Example 1. A composition comprising: a first layer comprising a polymer comprising a repeat unit having a structure comprising

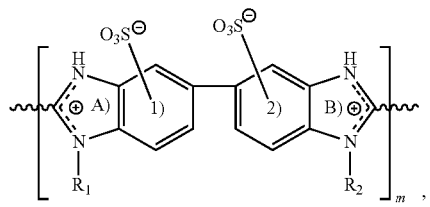

wherein: m is between 2 and 100, inclusively, the repeat unit is protonated at at least one of position A) or B) or sulfonated at at least one of rings 1) or 2), $R_1$ comprises at least one of a lone pair of electrons, a covalent bond, hydrogen, or a hydrocarbon functional group, $R_2$ comprises at least one of a lone pair of electrons, a covalent bond, hydrogen, or a hydrocarbon functional group, and ⌇ is a covalent bond.

Example 2. The composition of Example 1, wherein the repeat unit is protonated at at least one of position A) or B) and sulfonated at at least one of rings 1) or 2).

Example 3. The composition of either Example 1 or Example 2, wherein at least one of $R_1$ or $R_2$ comprises an alkyl functional group.

Example 4. The composition of any one of Examples 1-3, wherein the alkyl functional group comprises at least one of a methyl group, an ethyl group, a propyl, a butyl group, a pentyl group, or any isomer thereof.

Example 5. The composition of any one of Examples 1-4, wherein at least one of $R_1$ or $R_2$ further comprises at least one of oxygen, sulfur, phosphorus, nitrogen, or a halogen.

Example 6. The composition of any one of Examples 1-5, wherein m is between 40 and 70, inclusively.

Example 7. The composition of any one of Examples 1-6, wherein repeat unit further comprises a molecular weight between 100 g/mol and 350 g/mol, inclusively.

Example 8. The composition of any one of Examples 1-7, wherein the first layer has an average thickness between 1 μm and 1000 μm, inclusively.

Example 9. The composition of any one of Examples 1-8, wherein the average thickness is greater than 0 μm and about 10 μm.

Example 10. The composition of any one of Examples 1-9, wherein the first layer comprises a vanadium permeability less than about $2.0 \times 10^{-11}$ cm$^2$/min.

Example 11. The composition of any one of Examples 1-10, wherein the first layer further comprises a proton conductivity between about 100 mS/cm and about 300 mS/cm when measured immersed in an acidic electrolyte.

Example 12. The composition of any one of Examples 1-11, wherein the first layer comprises structural and chemical stability when immersed in at least one of an acidic electrolyte or a vanadium sulfate electrolytes.

Example 13. The composition of any one of Examples 1-12, wherein the first layer comprises a tensile strength greater than about 100 MPa.

Example 14. The composition of any one of Examples 1-13, wherein the first layer comprises a Young's modulus greater than about 3000 Mpa.

Example 15. The composition of any one of Examples 1-14, wherein the repeat unit further comprises an anion.

Example 16. The composition of any one of Examples 1-15, wherein the anion comprises at least one of $H_2PO_4^-$, $SO_4^{2-}$, or $HSO_4^-$.

Example 17. The composition of any one of Examples 1-16, wherein: the repeat unit further comprises a benzene ring such that the structure comprises

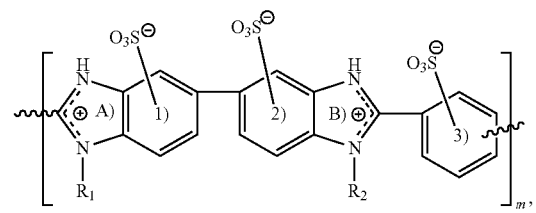

the repeat unit is protonated at at least one of position A) or B) or sulfonated at at least one of rings 1), 2), or 3).

Example 18. The composition of Example 17, wherein the repeat unit is protonated at at least one of position A) or B) and sulfonated at at least one of rings 1), 2), or 3).

Example 19. The composition of either Example 17 or Example 18, wherein at least one of $R_1$ or $R_2$ comprises an alkyl functional group.

Example 20. The composition of any one of Examples 17-19, wherein the alkyl functional group comprises at least one of a methyl group, an ethyl group, a propyl, a butyl group, a pentyl group, or any isomer thereof.

Example 21. The composition of any one of Examples 17-20, wherein at least one of $R_1$ or $R_2$ further comprises at least one of oxygen, sulfur, phosphorus, nitrogen, or a halogen.

Example 22. The composition of any one of Examples 17-21, wherein m is between 40 and 70, inclusively.

Example 23. The composition of any one of Examples 17-22, wherein repeat unit further comprises a molecular weight between 100 g/mol and 350 g/mol, inclusively.

Example 24. The composition of any one of Examples 17-23, wherein the first layer has an average thickness between 1 μm and 1000 μm, inclusively.

Example 25. The composition of any one of Examples 17-24, wherein the average thickness is greater than 0 m and about 10 μm.

Example 26. The composition of any one of Examples 17-25, wherein the first layer comprises a vanadium permeability less than about $2.0 \times 10^{-11}$ cm$^2$/min.

Example 27. The composition of any one of Examples 17-26, wherein the first layer comprises a proton conductivity between about 100 mS/cm and about 300 mS/cm when measured immersed in an acidic electrolyte.

Example 28. The composition of any one of Examples 17-27, wherein the first layer comprises structural and chemical stability when immersed in at least one of an acidic electrolyte or a vanadium sulfate electrolytes.

Example 29. The composition of any one of Examples 17-28, wherein the first layer comprises a tensile strength greater than about 100 MPa.

Example 30. The composition of any one of Examples 17-29, wherein the first layer comprises a Young's modulus greater than about 3000 Mpa.

Example 31. The composition of any one of Examples 17-30, wherein the repeat unit further comprises an anion.

Example 32. The composition of any one of Examples 1-31, wherein the anion comprises at least one of $H_2PO_4^-$, $SO_4^{2-}$, or $HSO_4^-$.

Example 33. The composition of any one of Examples 1-32, further comprising: a second layer comprising a perfluorosulfonic acid ionomer, wherein: the first layer is positioned adjacent to the second layer, forming a composite layer.

Example 34. The composition of any one of Examples 1-33, wherein the perfluorosulfonic acid ionomer comprises Nafion®.

Example 35. The composition of any one of Examples 1-34, further comprising: a support layer, wherein: the support layer is positioned adjacent to at least one of the first layer or the second layer.

Example 36. The composition of any one of Examples 1-35, wherein the support layer comprises at least one of a fiberglass or polyethylene terephthalate.

Example 37. The composition of any one of Examples 1-36, wherein the sulfonated polymeric structure comprises sulfonic functional groups covalently bonded to at least one benzene moiety of the sulfonated polymeric structure.

Example 38. The composition of any one of Examples 1-37, wherein the composite layer has an acid-free room temperature high proton conductivity and a superior ion selectivity relative to only the first layer and only the second layer.

Example 39. A method comprising: immersing in a solution a polymer comprising a repeat unit having a structure comprising at least one of

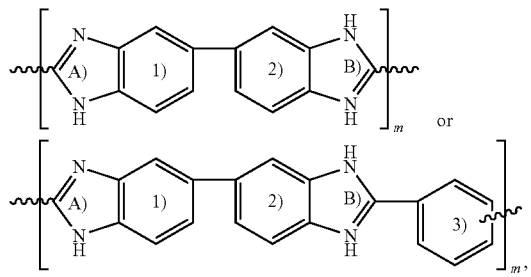

wherein: the solution comprises sulfuric acid and phosphoric acid, the immersing results in the transforming of the structure to at least one of a protonated structure or a sulfonated structure, m is between 2 and 100, inclusive, the repeat unit is protonated at at least one of position A) or B) or sulfonated at at least one of rings 1), 2) or 3), $R_1$ comprises at least one of a lone pair of electrons, a covalent bond, hydrogen, or a hydrocarbon functional group, $R_2$ comprises at least one of a lone pair of electrons, a covalent bond, hydrogen, or a hydrocarbon functional group, and ∿ is a covalent bond.

Example 40. The method of Example 39, wherein the immersing is performed at a temperature between about 120° C. and about 200° C.

Example 41. The method of either Example 39 or Example 40, wherein the immersing is performed for a period of time between about 3 hour and about 24 hours.

Example 42. The method of any one of Examples 39-41, wherein, prior to the immersing, the phosphoric acid is provided to the solution at a concentration between about 50 wt % and about 100 wt. % $H_3PO_4$.

Example 43. The method of any one of Examples 39-42, wherein, prior to the immersing, the sulfuric acid is provided to the solution at a concentration between about 50 wt % and about 100 wt. % $H_2SO_4$.

Example 44. The method of any one of Examples 39-43, wherein the polymer is in the form of a layer.

Example 45. A flow battery comprising a layer comprising a composition as described in any one of Examples 1-38, characterized by a coulombic efficiency of greater than about 99.5%.

Example 46. The flow battery of Example 45, further comprising a battery cycling stability of greater than 2 hours at 100 mA cm$^{-2}$.

Example 47. The flow battery of either Example 45 or 46, further comprising the absence of species cross-permeation across the film, wherein the species comprises at least a vanadium ion and a hydrogen ion.

Example 48. The flow battery of any one of Examples 45-47, further comprising the absence of ion crossover across the film under an applied current density less than or equal to about 500 mA cm$^{-2}$.

Example 49. The flow battery of any one of Examples 45-48, further comprising the absence of ion crossover across the film under a potential cycling and/or under a potential hold of about 1.4 V for several hours.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A composite layer comprising:
   a first layer consisting of a polymer;
   a second layer consisting of a perfluorosulfonic acid ionomer; and
   a support layer, wherein:
   the first layer is positioned adjacent to the second layer,
   the support layer is positioned adjacent to the first layer or the second layer, the polymer has a repeat unit comprising

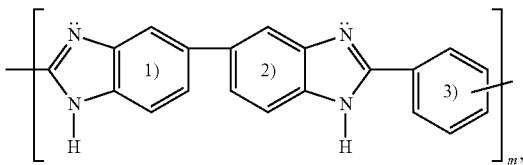

m is between 2 and 100, inclusively, and
the repeat unit is sulfonated at at least one of rings 1), 2), or 3).

2. The composite layer of claim 1, wherein the repeat unit comprises a molecular weight between 100 g/mol and 350 g/mol, inclusively.

3. The composite layer of claim 1, wherein the first layer has an average thickness between 1 μm and 1000 μm, inclusively.

4. The composite layer of claim 3, wherein the first layer comprises a vanadium permeability of less than $2.0 \times 10^{-11}$ cm$^2$/min.

5. The composite layer of claim 4, wherein the first layer comprises a proton conductivity between 100 mS/cm and 300 mS/cm when measured immersed in an acidic electrolyte.

6. The composite layer of claim 3, wherein the first layer comprises a tensile strength greater than 100 MPa.

7. The composite layer of claim 6, wherein the first layer further comprises a Young's modulus greater than 3000 MPa.

8. The composite layer of claim 1, wherein the repeat unit further comprises an anion.

9. The composite layer of claim 8, wherein the anion comprises at least one of $H_2PO_4^-$, $SO_4^{2-}$, or $HSO_4^-$.

10. The composite layer of claim 1, wherein the support layer comprises at least one of a fiberglass or polyethylene terephthalate.

11. The composite layer of claim 1, wherein ring 3) is sulfonated.

12. A flow battery comprising the composite layer of claim 1, wherein the flow battery is characterized by a coulombic efficiency of greater than 99.5%.

* * * * *